United States Patent
Fahley et al.

(10) Patent No.: US 8,570,152 B2
(45) Date of Patent: *Oct. 29, 2013

(54) METHOD AND APPARATUS FOR WIRELESS SENSING WITH POWER HARVESTING OF A WIRELESS SIGNAL

(75) Inventors: Stephen L. Fahley, Renton, WA (US); William Preston Geren, Shoreline, WA (US); Jason P. Bommer, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 752 days.

This patent is subject to a terminal disclaimer.

(21) Appl. No.: 12/508,281

(22) Filed: Jul. 23, 2009

(65) Prior Publication Data

US 2011/0018686 A1    Jan. 27, 2011

(51) Int. Cl.
*B64C 1/06* (2006.01)
*G01M 17/00* (2006.01)
*G08B 25/01* (2006.01)
*G08B 23/00* (2006.01)
*G08B 1/08* (2006.01)
*H04Q 5/22* (2006.01)

(52) U.S. Cl.
USPC ....... 340/10.1; 244/119; 340/13.26; 340/531; 340/538; 340/693.1; 340/945; 701/29.1; 701/32.7; 701/32.8

(58) Field of Classification Search
USPC ............ 244/119, 221, 123.3, 123.7, 123.9; 307/149; 333/235, 239; 343/705, 343/708–712; 701/2, 3, 14, 29–35; 340/850, 852, 945, 963, 438, 500, 340/501–502, 505, 517, 531, 538, 539.1, 340/539.22, 539.24, 539.26, 693.1, 340/693.9–693.12, 9.1, 10.1, 12.3, 340/13.24–13.28
See application file for complete search history.

(56) References Cited

U.S. PATENT DOCUMENTS

| | | | |
|---|---|---|---|
| 1,987,337 A * | 1/1935 | Hammerling | .................. 24/440 |
| 2,491,418 A | 12/1949 | Schlesman | |
| 2,561,756 A | 7/1951 | Shook | |
| 2,593,714 A | 4/1952 | Robinson | |
| 2,630,472 A | 3/1953 | McArthur | |
| 3,028,292 A | 4/1962 | Hisids et al. | |

(Continued)

FOREIGN PATENT DOCUMENTS

| | | |
|---|---|---|
| DE | 1949209 A1 | 4/1971 |
| EP | 0215698 A2 | 3/1987 |

(Continued)

OTHER PUBLICATIONS

PCT Search for application PCT/US2010/040668 dated Feb. 17, 2011.
"How about this? Avionics would go in plane's skin", Electronics, VNU Business Puyblications, New York, US, vol. 60, No. 21, Oct. 15, 1987.
PCT Search Report for application PCT/US2010/036082 dated Nov. 18, 2010.
U.S. Appl. No. 12/534,356, filed Aug. 3, 2009, McCarville et al.
USPTO office action for U.S. Appl. No. 11/937,006 dated Dec. 30, 2009.

(Continued)

*Primary Examiner* — Steven Lim
*Assistant Examiner* — Stephen Burgdorf
(74) *Attorney, Agent, or Firm* — Yee & Associates, P.C.

(57) ABSTRACT

A method and apparatus for operating a sensor system. A first wireless signal is transmitted from a base station to a sensor unit. At least a portion of the first wireless signal is changed into power for the sensor unit using a power harvesting unit in the sensor unit. Information is received from a number of sensors associated with the sensor unit. The information is transmitted to the base station using a second wireless signal.

22 Claims, 15 Drawing Sheets

(56) References Cited

U.S. PATENT DOCUMENTS

| | | | |
|---|---|---|---|
| 3,205,288 A | 9/1965 | Bates | |
| 3,390,393 A * | 6/1968 | Upton | 343/708 |
| 3,421,336 A | 1/1969 | Lichtenberger et al. | |
| 3,530,021 A | 9/1970 | Reichl | |
| 3,779,487 A | 12/1973 | Ashton et al. | |
| 3,963,425 A | 6/1976 | Sambrook | |
| 3,979,005 A | 9/1976 | Robinson et al. | |
| 4,019,291 A * | 4/1977 | Ernst | 52/36.6 |
| 4,053,667 A | 10/1977 | Smith | |
| 4,079,903 A | 3/1978 | Ashton et al. | |
| 4,197,545 A | 4/1980 | Favaloro et al. | |
| 4,510,500 A | 4/1985 | Brune | |
| 4,538,780 A | 9/1985 | Roe | |
| 4,776,907 A | 10/1988 | Massions | |
| 4,792,493 A | 12/1988 | Bertram et al. | |
| 5,170,666 A | 12/1992 | Larsen | |
| 5,184,141 A | 2/1993 | Connolly et al. | |
| 5,197,697 A | 3/1993 | Lyloc et al. | |
| 5,222,166 A | 6/1993 | Weltha | |
| 5,242,523 A | 9/1993 | Willden et al. | |
| 5,255,880 A | 10/1993 | Lyloc et al. | |
| 5,268,392 A | 12/1993 | Bertram | |
| 5,271,986 A | 12/1993 | Dublinski et al. | |
| 5,332,178 A | 7/1994 | Williams | |
| 5,348,601 A | 9/1994 | Ray | |
| 5,363,464 A | 11/1994 | Way et al. | |
| 5,403,424 A | 4/1995 | Ehrat et al. | |
| 5,415,504 A | 5/1995 | Wolf et al. | |
| 5,419,139 A | 5/1995 | Blum et al. | |
| 5,458,330 A | 10/1995 | Baum | |
| 5,527,414 A | 6/1996 | Dublinski et al. | |
| 5,624,622 A | 4/1997 | Boyce et al. | |
| 5,632,940 A | 5/1997 | Whatley | |
| 5,647,658 A | 7/1997 | Ziadi | |
| 5,854,336 A | 12/1998 | Divone, Sr. et al. | |
| 5,863,635 A | 1/1999 | Childress | |
| 5,958,550 A | 9/1999 | Childress | |
| 6,039,832 A | 3/2000 | McCarville | |
| 6,116,179 A * | 9/2000 | Swinbanks et al. | 114/269 |
| 6,117,376 A | 9/2000 | Merkel | |
| 6,159,414 A | 12/2000 | Tunis, III et al. | |
| 6,187,411 B1 | 2/2001 | Palmer | |
| 6,198,445 B1 | 3/2001 | Alt et al. | |
| 6,450,678 B1 | 9/2002 | Bayersdorfer | |
| 6,458,309 B1 | 10/2002 | Allen et al. | |
| 6,497,190 B1 | 12/2002 | Lewit | |
| 6,510,961 B1 | 1/2003 | Head et al. | |
| 6,632,502 B1 | 10/2003 | Allen et al. | |
| 6,638,466 B1 | 10/2003 | Abbott | |
| 6,653,980 B2 | 11/2003 | Ceccom et al. | |
| 6,689,246 B2 | 2/2004 | Hirahara et al. | |
| 6,739,861 B2 | 5/2004 | Cournoyer et al. | |
| 6,755,998 B1 | 6/2004 | Reichard et al. | |
| 6,781,477 B1 * | 8/2004 | Stancil | 333/125 |
| 6,889,937 B2 | 5/2005 | Simpson et al. | |
| 6,949,282 B2 | 9/2005 | Obeshaw | |
| 6,960,993 B2 | 11/2005 | Mattes et al. | |
| 6,999,857 B1 | 2/2006 | Kasper et al. | |
| 7,001,082 B2 * | 2/2006 | Morrison | 385/88 |
| 7,018,217 B2 * | 3/2006 | Marshall et al. | 439/67 |
| 7,063,763 B2 | 6/2006 | Chapman, Jr. | |
| 7,074,474 B2 | 7/2006 | Toi et al. | |
| 7,118,370 B2 | 10/2006 | Willden et al. | |
| 7,205,956 B1 * | 4/2007 | Sychaleun et al. | 343/890 |
| 7,207,523 B2 * | 4/2007 | Callahan et al. | 244/118.6 |
| 7,216,832 B2 | 5/2007 | Simpson et al. | |
| 7,246,521 B2 | 7/2007 | Kim | |
| 7,268,517 B2 | 9/2007 | Rahmel et al. | |
| 7,276,703 B2 * | 10/2007 | Berkcan et al. | 250/358.1 |
| 7,277,822 B2 | 10/2007 | Blemel | |
| 7,281,318 B2 * | 10/2007 | Marshall et al. | 29/621 |
| 7,296,769 B2 | 11/2007 | Hogenson et al. | |
| 7,343,265 B2 * | 3/2008 | Andarawis et al. | 702/188 |
| 7,349,225 B1 | 3/2008 | Bennett | |
| 7,400,253 B2 | 7/2008 | Cohen | |
| 7,419,627 B2 | 9/2008 | Sheu et al. | |
| 7,646,135 B1 * | 1/2010 | Churchill et al. | 310/313 R |
| 7,705,725 B2 * | 4/2010 | Matsen et al. | 340/529 |
| 7,719,416 B2 | 5/2010 | Arms et al. | |
| 7,830,523 B2 | 11/2010 | Bommer et al. | |
| 7,830,888 B2 | 11/2010 | Donovan | |
| 7,861,969 B2 | 1/2011 | Guzman et al. | |
| 7,864,039 B2 * | 1/2011 | Georgeson | 340/529 |
| 7,879,276 B2 | 2/2011 | Guzman et al. | |
| 8,022,793 B2 | 9/2011 | Olson et al. | |
| 8,022,843 B2 * | 9/2011 | Mitchell et al. | 340/973 |
| 8,026,857 B2 | 9/2011 | Bommer | |
| 8,044,812 B2 * | 10/2011 | Harres | 340/619 |
| 8,094,062 B2 | 1/2012 | Hook | |
| 8,098,143 B2 | 1/2012 | Andarawis et al. | |
| 8,100,361 B2 | 1/2012 | Grauerholz | |
| 8,128,030 B2 * | 3/2012 | Dannenberg | 244/119 |
| 8,234,924 B2 | 8/2012 | Saxena et al. | |
| 8,274,383 B2 * | 9/2012 | Mitchell et al. | 340/539.26 |
| 8,326,465 B2 * | 12/2012 | Rosca et al. | 700/276 |
| 8,377,247 B2 | 2/2013 | Guzman et al. | 156/285 |
| 8,419,402 B2 | 4/2013 | Guzman et al. | 425/110 |
| 2001/0017336 A1 | 8/2001 | Hirahara et al. | |
| 2002/0011047 A1 | 1/2002 | Obeshaw | |
| 2002/0050925 A1 * | 5/2002 | Arms et al. | 340/505 |
| 2002/0178992 A1 | 12/2002 | Lewit | |
| 2003/0192990 A1 | 10/2003 | Simpson et al. | |
| 2003/0216149 A1 | 11/2003 | Edwards et al. | |
| 2004/0048582 A1 * | 3/2004 | Mattes et al. | 455/99 |
| 2004/0051214 A1 | 3/2004 | Sheu et al. | |
| 2004/0150529 A1 * | 8/2004 | Benoit et al. | 340/679 |
| 2004/0166408 A1 * | 8/2004 | Anderson et al. | 429/218.1 |
| 2005/0003145 A1 | 1/2005 | Toi et al. | |
| 2005/0056362 A1 | 3/2005 | Benson et al. | |
| 2005/0128028 A1 | 6/2005 | Sanchez et al. | |
| 2005/0186994 A1 * | 8/2005 | Rahmel et al. | 455/572 |
| 2005/0211843 A1 | 9/2005 | Simpson et al. | |
| 2005/0213548 A1 * | 9/2005 | Benson et al. | 370/338 |
| 2005/0230552 A1 | 10/2005 | Engwall et al. | |
| 2005/0259919 A1 * | 11/2005 | Aldridge et al. | 385/37 |
| 2006/0226287 A1 | 10/2006 | Grantham et al. | |
| 2007/0046298 A1 | 3/2007 | Safai et al. | |
| 2007/0090294 A1 | 4/2007 | Safai et al. | |
| 2007/0109121 A1 * | 5/2007 | Cohen | 340/539.26 |
| 2007/0114422 A1 * | 5/2007 | Berkcan et al. | 250/358.1 |
| 2007/0118335 A1 * | 5/2007 | Andarawis et al. | 702/188 |
| 2007/0145638 A9 | 6/2007 | Mead | |
| 2007/0151375 A1 | 7/2007 | Kennedy et al. | |
| 2007/0176840 A1 | 8/2007 | Pristas et al. | |
| 2008/0036617 A1 * | 2/2008 | Arms et al. | 340/679 |
| 2008/0089087 A1 | 4/2008 | Stoner | |
| 2008/0111024 A1 | 5/2008 | Lee et al. | |
| 2008/0157429 A1 | 7/2008 | Callis et al. | |
| 2008/0185478 A1 | 8/2008 | Dannenberg | |
| 2008/0226876 A1 | 9/2008 | Roth | |
| 2008/0290214 A1 | 11/2008 | Guzman et al. | |
| 2009/0057487 A1 | 3/2009 | Velicki et al. | |
| 2009/0058361 A1 * | 3/2009 | John | 320/128 |
| 2009/0101756 A1 | 4/2009 | Cacciaguerra | |
| 2009/0108211 A1 | 4/2009 | Bommer et al. | |
| 2009/0127393 A1 | 5/2009 | Guzman et al. | |
| 2009/0184877 A1 | 7/2009 | Bommer | |
| 2009/0243895 A1 | 10/2009 | Mitchell et al. | |
| 2009/0325628 A1 | 12/2009 | Becker | |
| 2010/0011865 A1 | 1/2010 | Saxena et al. | |
| 2010/0114383 A1 * | 5/2010 | Rosca et al. | 700/276 |
| 2010/0129589 A1 | 5/2010 | Senibi et al. | |
| 2010/0141377 A1 * | 6/2010 | Andarawis et al. | 340/3.1 |
| 2010/0176939 A1 * | 7/2010 | Harres | 340/539.1 |
| 2010/0231382 A1 * | 9/2010 | Tayrani et al. | 340/539.27 |
| 2010/0318243 A1 | 12/2010 | Lewis et al. | |
| 2011/0027526 A1 | 2/2011 | McCarville et al. | |
| 2011/0049935 A1 | 3/2011 | Locher et al. | |
| 2011/0076461 A1 | 3/2011 | Jacob et al. | |
| 2011/0080057 A1 * | 4/2011 | Bowman et al. | 307/149 |
| 2011/0088833 A1 | 4/2011 | Guzman et al. | |
| 2011/0111183 A1 | 5/2011 | Guzman et al. | |
| 2011/0139932 A1 | 6/2011 | Matheson et al. | |
| 2011/0188862 A1 * | 8/2011 | Fuss et al. | 398/115 |

(56) References Cited

U.S. PATENT DOCUMENTS

| | | | |
|---|---|---|---|
| 2011/0250384 | A1 | 10/2011 | Sumi et al. |
| 2011/0254267 | A1 | 10/2011 | Marengo |
| 2012/0175464 | A1 | 7/2012 | Brownjohn et al. |

FOREIGN PATENT DOCUMENTS

| | | | |
|---|---|---|---|
| GB | 1522432 A | | 8/1978 |
| JP | 4329125 A | | 11/1992 |
| JP | 2005291708 A | | 10/2005 |
| WO | 8601039 A1 | | 2/1986 |
| WO | WO2004102056 A2 | | 11/2004 |
| WO | 2005096571 A1 | | 10/2005 |
| WO | WO2005105402 A | | 11/2005 |
| WO | WO2007041256 A2 | | 4/2007 |
| WO | 2008010841 A1 | | 1/2008 |
| WO | WO 2008010841 A1 | * | 1/2008 |
| WO | WO2008076020 A1 | | 6/2008 |
| WO | WO2009023346 A2 | | 2/2009 |
| WO | WO2009055218 A2 | | 4/2009 |
| WO | 2010040004 A1 | | 4/2010 |
| WO | WO2010065330 A1 | | 6/2010 |
| WO | WO2010144248 A1 | | 12/2010 |
| WO | WO2011011110 A1 | | 1/2011 |
| WO | WO2011016931 A2 | | 2/2011 |

OTHER PUBLICATIONS

USPTO office action for U.S. Appl. No. 11/753,482 dated Mar. 31, 2010.
International Search Report for PCT/US2009/065195 dated Mar. 8, 2010.
Seibert et al., "Applications for PMI foams in aerospace sandwich structures", Reinforced Plastics, Elsevier Advanced Technology, NY, vol. 50, No. 1, Jan. 2006, pp. 44-48.
Marasco et al., "Mechanical properties balance in novel Z-pinned sandwich panels: Out-of-Plane properties", Composites Part A: Applied Science and Manufacturing, Elsevier Science Publishers, Amsterdam, NL, vol. 37, No. 2, Feb. 2006, pp. 295-302.
USPTO Final office action for U.S. Appl. No. 11/937,006 dated Jun. 22, 2010.
UPSTO Non-final office action for U.S. Appl. No. 12/277,483 dated May 31, 2011.
O'Brien et al., "Assessment of Composite Delamination Self-Healing via Micro-Encapsulation", Proceedings of American Society for Composites 23rd Technical Conference, Sep. 2008.
Greenhaigh et al., "The Assessment of Novel Materials and Processes for the Impact Tolerant Design of Stiffened Composite Aerospace Structures", Composites: Part A, 34, 2003, pp. 151-161.
"Communication and Power through Structural Airframe Stringers for On-board Wireless Sensors", pp. 1-10 retrieved Jun. 18, 2009 from: https://sql-pw-01.nw.nos.boeing.com/structures/StratProjects/bp1_12_18_08/BTEC2009WirelessBusDraft12.17.08.pdf.
U.S. Appl. No. 12/484,151, filed Jun. 12, 2009, Lewis et al.
USPTO Notice of allowance for U.S. Appl. No. 11/937,006 dated Oct. 6, 2010.
Ko, "The future of sensor and actuator systems", Sensors and Actuators, Elsevier Sequoia S.A. Lausanne, CH vol. 56 No. 1, Aug. 1, 1996, pp. 193-197.
PCt Search Report for application PCT/US2010/036130 dated Mar. 1, 2011.
USPTO Final Office Action dated Jul. 19, 2010 for U.S. Appl. No. 11/753,482, 14 pages.
USPTO Notice of Allowance dated Sep. 7, 2010 for U.S. Appl. No. 11/753,482, 9 pages.
USPTO Office Action dated Oct. 31, 2011 for U.S. Appl. No. 13/005,786, 26 pages.
International Search Report, dated Apr. 23, 2009, regarding Application No. PCT/US2008/064427 (WO2009023346), 3 pages.
International Search Report, dated Jun. 16, 2009, regarding Application No. PCT/US2008/078438 (WO2009055218), 6 pages.
Abbasi et al., "Microwave Nondestruction Detection of Longitudinal Cracks in Pipe with U-bend and Prediction of its Locatin by Signal Processing," In: Electromagnetic Nondestructive Evaluation (XI), Tamburrino et al. (Eds.), IOS Press, Oct. 2008, pp. 154-161. (abstract only).
Caspers et al., "Waveguide Mode Reflectometry for Obstacle Detection in the LHC Beam Pipe Including Signal Attenuation," Proceedings of the 2003 Particle Accelerator Conference (PAC 2003), vol. 4, May 2003, pp. 2700-2702.
Hatfield et al., "Electromagnetic Reverberation Characteristics of a Large Transport Aircraft", Naval Surface Warfare Center Dahlgren Division, NSWCDD/TR-93/339, Jul. 1994, 95 pages.
Hill et al., "Aperture Excitation of Electrically Large, Lossy Cavities", IEEE Transactions on Electromagnetic Compatibility, vol. 36, No. 3, Aug. 1994, pp. 169-178.
Hladio et al., "A passive wireless displacement sensor for structural health monitoring of civil structures," SPIE Proceedings vol. 6531, Apr. 2007, pp. 653114.1-653114.7. (abstract only).
Partridge et al., "Manufacture and Performance of Z-Pinned Composites," In: Advance Polymeric Materials: Structure Property Relationships, CRC Press, Apr. 2003, pp. 98-137.
Shibata et al., "Experimental study on NDT method using electromagnetic waves," Journal of Materials Processing Technology, vol. 161, No. 1-2, Apr. 2005, pp. 348-352. (abstract only).
Office Action, dated May 10, 2012, regarding U.S. Appl. No. 12/976,070, 31 pages.
Notice of Allowance, dated Oct. 15, 2012, regarding U.S. Appl. No. 12/976,070, 19 pages.
Final Office Action, dated Jul. 13, 2012, regarding U.S. Appl. No. 13/005,786, 7 pages.
Notice of Allowance, dated Feb. 1, 2013, regarding U.S. Appl. No. 13/005,786, 22 pages.
Office Action, dated Feb. 23, 2010, regarding U.S. Appl. No. 11/925,622, 19 pages.
Notice of Allowance, dated Jul. 12, 2010, regarding U.S. Appl. No. 11/925,622, 6 pages.
Office Action, dated Jul. 9, 2010, regarding U.S. Appl. No. 12/016,018, 6 pages.
Office Action, dated Jan. 4, 2011, regarding U.S. Appl. No. 12/016,018, 9 pages.
Notice of Allowance, dated Jun. 27, 2011, regarding U.S. Appl. No. 12/016,018, 7 pages.
Final Office Action, dated Nov. 2, 2011, regarding U.S. Appl. No. 12/277,483, 12 pages.
Office Action, dated Feb. 24, 2012, regarding U.S. Appl. No. 12/277,483, 19 pages.
Final Office Action, dated Aug. 6, 2012, regarding U.S. Appl. No. 12/277,483, 14 pages.
Notice of Allowance, dated Nov. 7, 2012, regarding U.S. Appl. No. 12/277,483, 7 pages.
Office Action, dated May 17, 2012, regarding U.S. Appl. No. 12/484,151, 38 pages.
Office Action, dated Dec. 13, 2012, regarding U.S. Appl. No. 12/484,151, 32 pages.
Office Action, dated Jun. 7, 2012, regarding U.S. Appl. No. 12/534,356, 34 pages.
Final Office Action, dated Oct. 26, 2012, regarding U.S. Appl. No. 12/534,356, 28 pages.
Notice of Allowance, dated Apr. 2, 2013, regarding U.S. Appl. No. 12/484,151, 27 pages.
Office Action, dated Apr. 19, 2012, regarding U.S. Appl. No. 12/534,356, 18 pages.

* cited by examiner

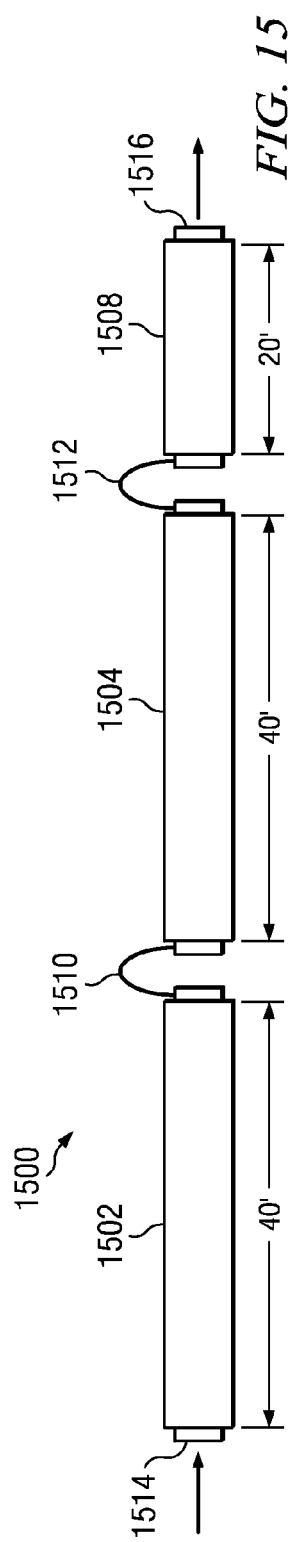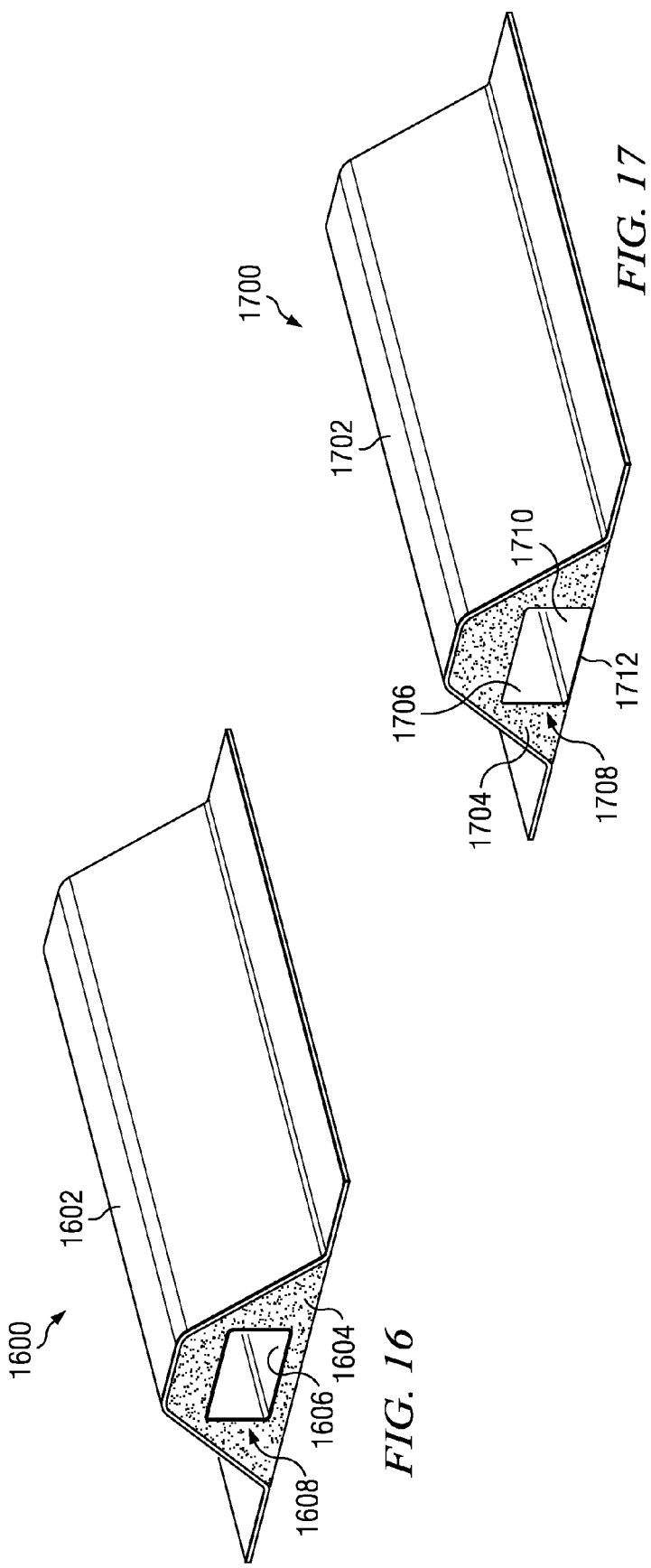

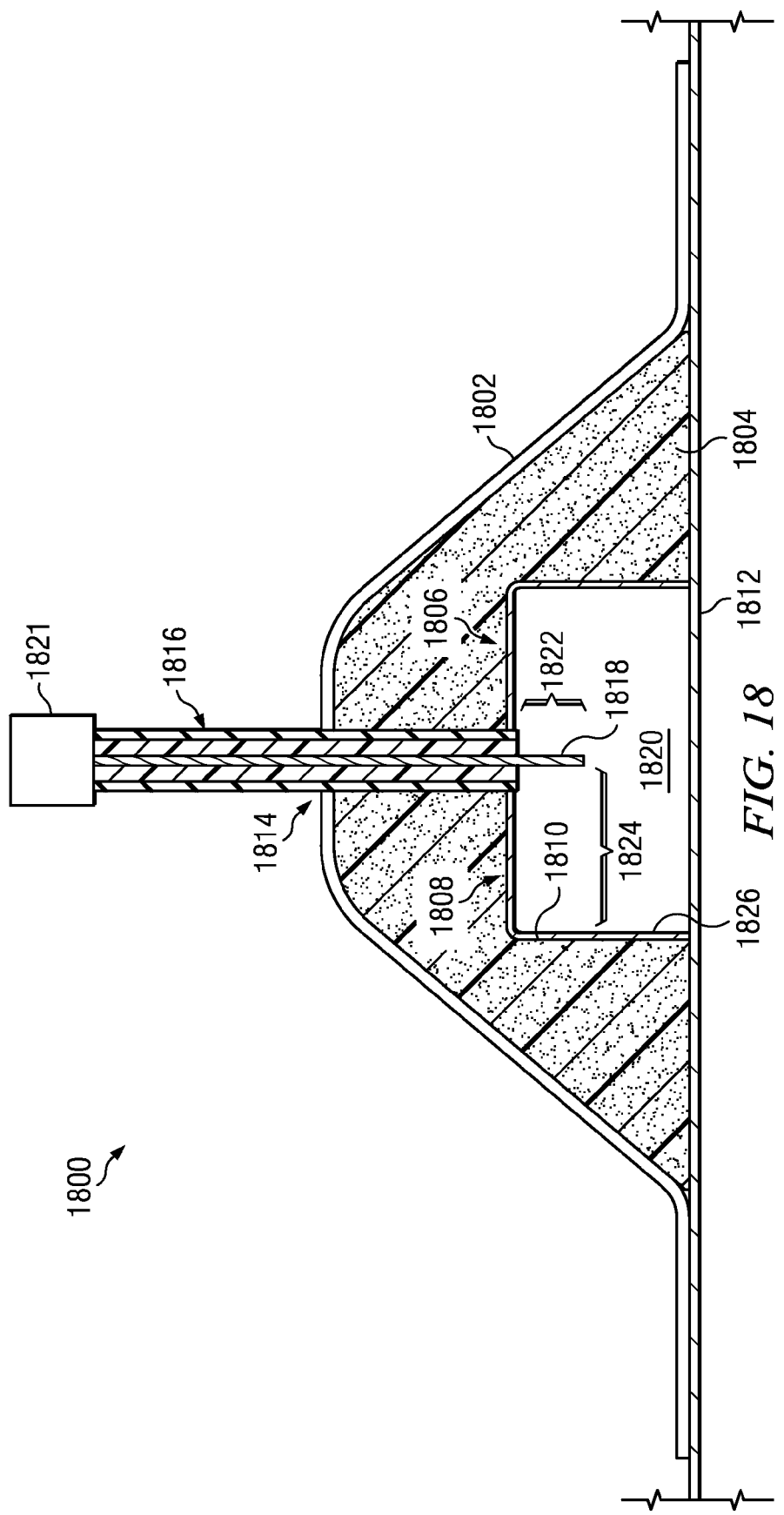

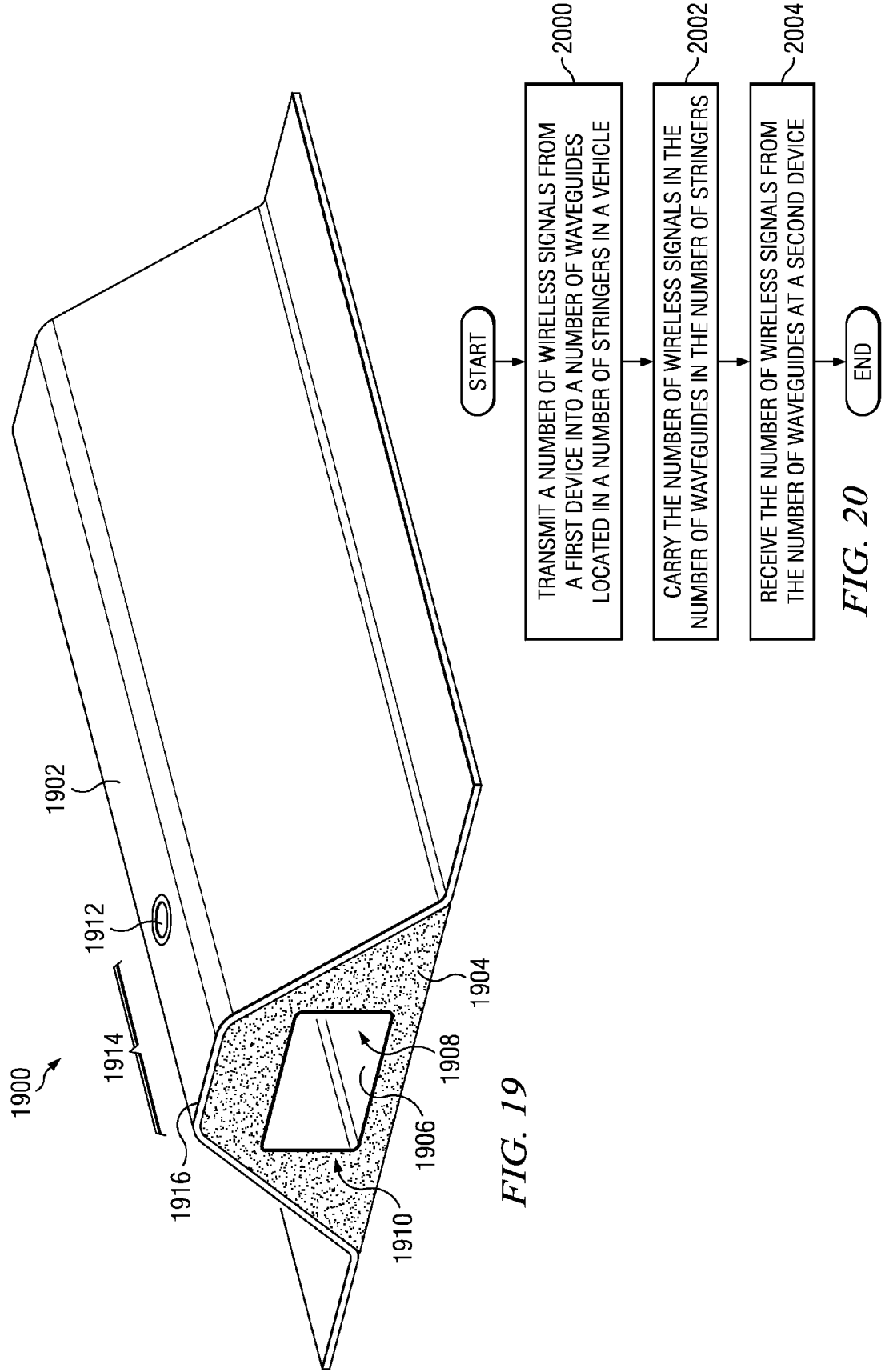

METHOD AND APPARATUS FOR WIRELESS SENSING WITH POWER HARVESTING OF A WIRELESS SIGNAL

BACKGROUND INFORMATION

1. Field

The present disclosure relates generally to aircraft and, in particular, to network data processing systems in aircraft. Still more particularly, the present disclosure relates to a method and apparatus for a wireless communications and power system in a network data processing system in an aircraft.

2. Background

Aircraft contain many devices that use power and exchange information. These devices include, for example, without limitation, flight control computers, in-flight entertainment systems, line replaceable units, environmental control systems, sensors, and other suitable devices. Many of these devices may be non-critical and may require low amounts of power. Examples of these devices include a proximity sensor, a temperature sensor, an accelerometer, and/or some other suitable type of sensor. These sensors and other types of sensors may be used in a health monitoring system on an aircraft to perform health monitoring of the aircraft.

The sensors in a health monitoring system may monitor various conditions during the operation of an aircraft. For example, sensors monitor temperatures of various devices, vibrations, force, and/or other relevant conditions. This information is sent to a line replaceable unit or other type of data processing system in the health monitoring system. The information is analyzed to identify maintenance needs for the aircraft. As a result, these types of sensors add benefits including condition-based maintenance and increased safety.

Implementing a health monitoring system in an aircraft involves additional wiring used to provide the exchange of information and power between different devices in the health monitoring system. The wiring for a health monitoring system adds weight, cost, and/or maintenance burdens to an aircraft. These factors may reduce performance and/or increase operating costs.

Therefore, it would be advantageous to have a method and apparatus that takes into account one or more of the issues discussed above, as well as possibly other issues.

SUMMARY

In one advantageous embodiment, an apparatus comprises a power harvesting unit configured to generate power using a first wireless signal, a sensor interface configured to receive information from a number of sensors, and a wireless communications unit connected to the sensor interface and the power harvesting unit. The wireless communications unit is configured to use the power generated by the power harvesting unit and transmit the information using a second wireless signal.

In another advantageous embodiment, a method is present for transmitting information. At least a portion of a first wireless signal is changed into power for a sensor unit in response to receiving the first wireless signal. The information is received from a number of sensors configured to send the information to the sensor unit. The information is transmitted in a second wireless signal generated by the sensor unit.

In yet another advantageous embodiment, a method is present for operating a sensor system. A first wireless signal is transmitted from a base station to a sensor unit. At least a portion of the first wireless signal is changed into power for the sensor unit using a power harvesting unit in the sensor unit. Information is received from a number of sensors associated with the sensor unit. The information is transmitted to the base station using a second wireless signal.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 15 is a diagram illustrating composite stringers connected to each other in a network in accordance with an advantageous embodiment;

FIG. 16 is a diagram illustrating a cross-sectional perspective view of a hat-shaped stringer with a waveguide in accordance with an advantageous embodiment;

FIG. 17 is a diagram of a cross-sectional perspective view of a portion of a composite stringer in accordance with an advantageous embodiment;

FIG. 18 is a diagram illustrating a cross-sectional view of a waveguide with an access point in accordance with an advantageous embodiment;

FIG. 19 is a diagram of a composite stringer with a location for an access point in accordance with an advantageous embodiment;

FIG. 20 is a flowchart of a process for transmitting wireless signals in a vehicle in accordance with an advantageous embodiment;

DETAILED DESCRIPTION

Figure 1:
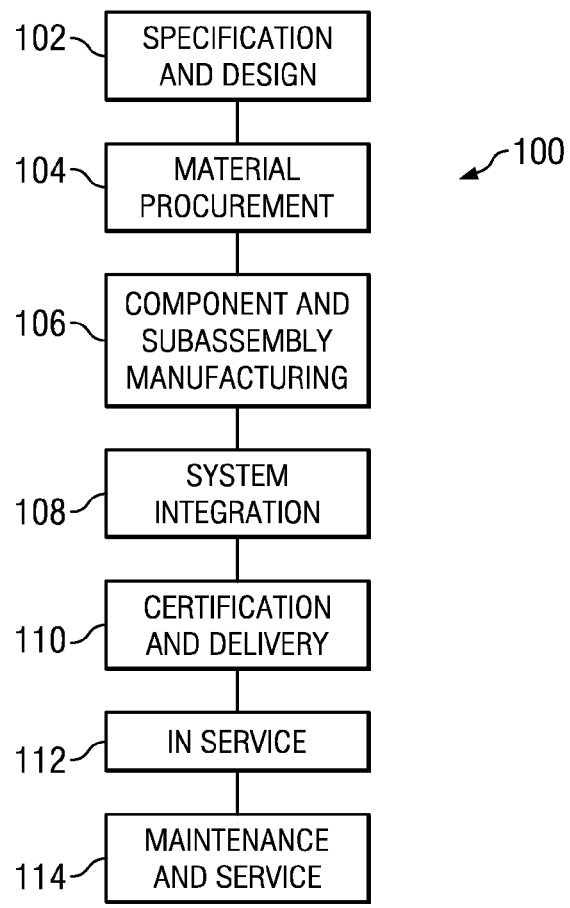
FIG. 1 is a diagram illustrating an aircraft manufacturing and service method in accordance with an advantageous embodiment.
Figure 2:
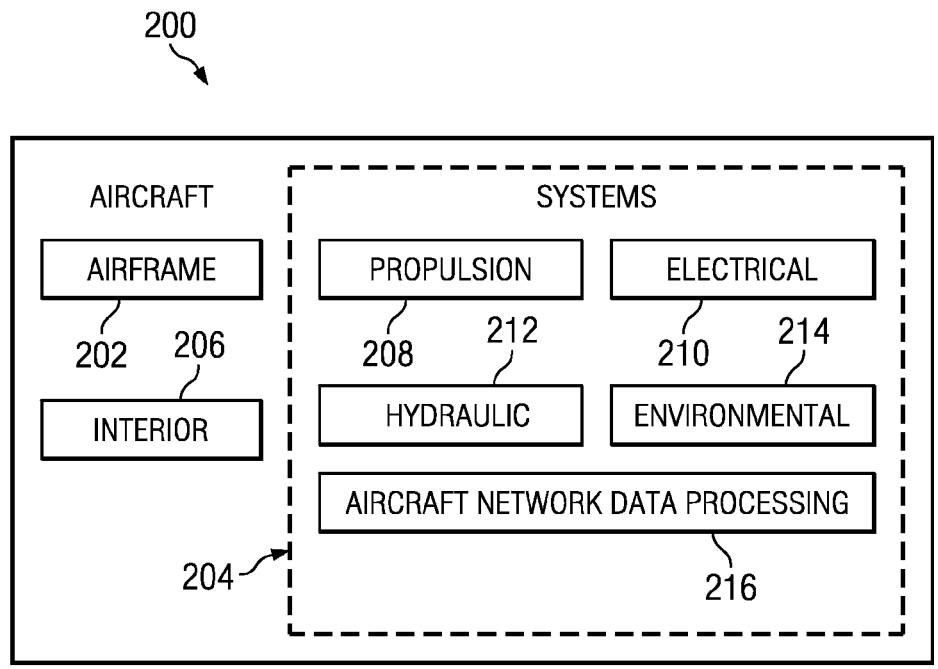
FIG. 2 is a block diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a block diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and aircraft network data processing system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

As an illustrative example, in one or more advantageous embodiments, an aircraft network data processing system, such as aircraft network data processing system 216, may be implemented during system integration 108 in FIG. 1. Aircraft network data processing system 216 may be used to distribute information and power.

This type of network may include, for example, without limitation, a health monitoring system, a flight control system, an in-flight entertainment system, an environmental control system, and/or any other type of system which exchanges information and/or power in aircraft 200. In yet other advantageous embodiments, aircraft network data processing system 216 may be implemented during maintenance and service 114 in FIG. 1. During maintenance and service 114, upgrades to aircraft 200 may be performed to include aircraft network data processing system 216.

The different advantageous embodiments recognize and take into account a number of different considerations. For example, the different advantageous embodiments recognize and take into account that wireless networks may be used to distribute information and power within an aircraft. The different advantageous embodiments, however, recognize that this type of system may have a number of different problems. For example, with a wireless network using transmitters and repeaters within a cabin or fuselage, interference may occur. For example, without limitation, people, galley carts, and/or other items may interfere with the propagation of wireless signals within the aircraft.

The different advantageous embodiments recognize and take into account that increased power may be needed to transmit the signals for information and power when these signals are transmitted within the cabin or other open areas of the fuselage. These types of signals may cause interference with other devices and/or signals.

Thus, one or more of the different advantageous embodiments provide a method and apparatus for transmitting information using wireless signals. In one advantageous embodiment, an apparatus comprises a power harvesting unit, a sensor interface, and a wireless communications unit. The power harvesting unit is configured to generate power using a first wireless signal. The sensor interface is configured to receive information from a number of sensors. The wireless communications unit is connected to the sensor interface and the power harvesting unit. The wireless communications unit is configured to use the power generated by the power harvesting unit and to transmit information using a second signal.

In these illustrative examples, one component may be connected to another component through a direct connection. In other advantageous embodiments, one component may be connected to another component through one or more intermediate components. For example, without limitation, the wireless communications unit may be connected to the power harvesting unit through the sensor interface. In other advantageous embodiments, the wireless communications unit may be connected directly to the power harvesting unit.

Figure 3:
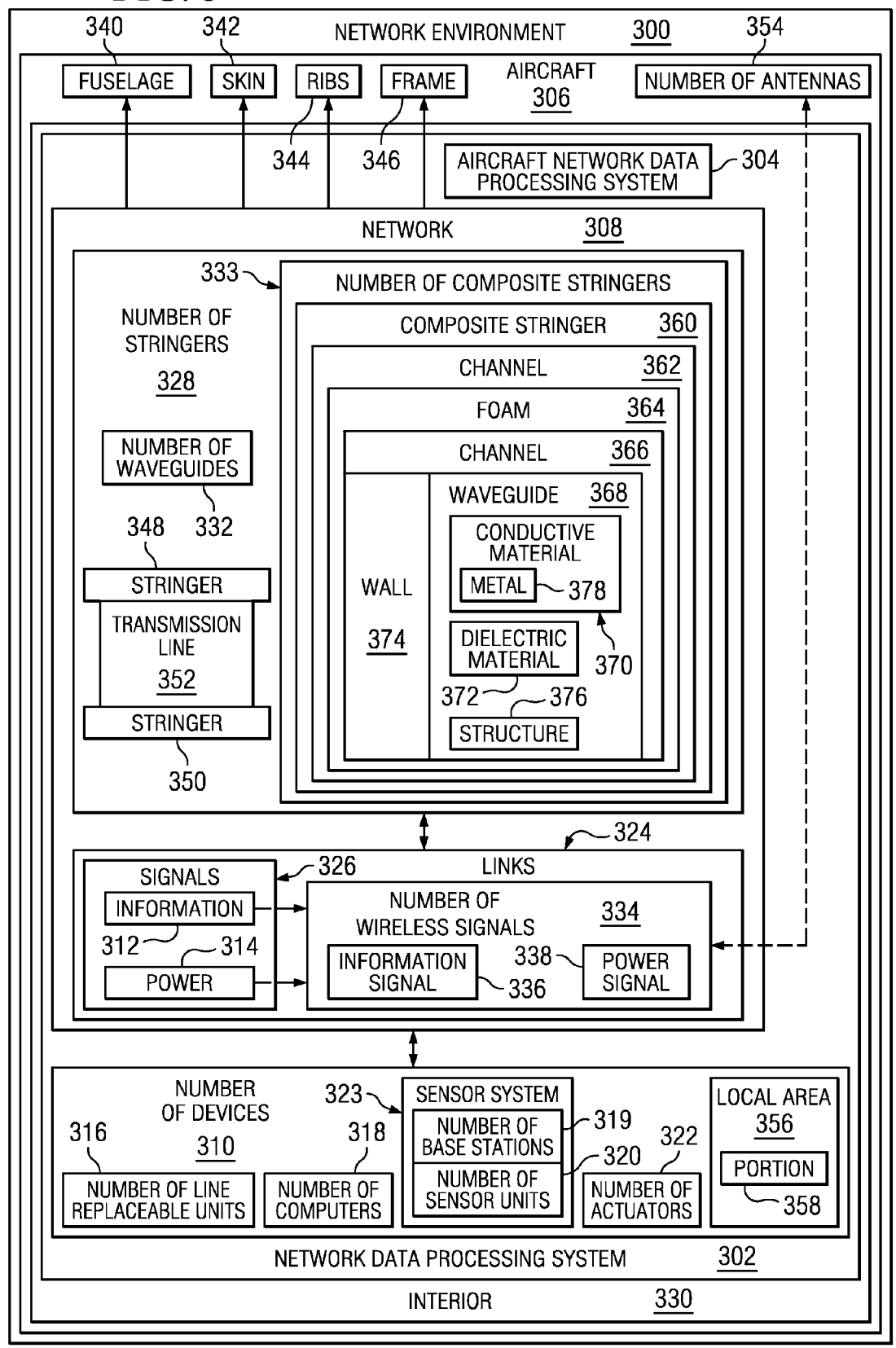
FIG. 3 is a diagram of a network environment in accordance with an advantageous embodiment.

With reference now to FIG. 3, a diagram of a network environment is depicted in accordance with an advantageous embodiment. In this illustrative example, network environment 300 may include network data processing system 302.

Network data processing system 302 may take the form of aircraft network data processing system 304 located within aircraft 306 in network environment 300.

Network data processing system 302 has network 308 to which number of devices 310 is associated. Number of devices 310 may be any device capable of transmitting and/or receiving at least one of information 312 and power 314 using network 308. A device in number of devices 310 may be associated with network 308 if the device is capable of transmitting and/or receiving at least one of information 312 and power 314 using network 308.

Information 312 may contain information such as, for example, data, commands, programs, and/or other suitable information. Power 314 may be used to power number of devices 310. A number, as used herein, with reference to items, refers to one or more items. For example, number of devices 310 is one or more devices. In these illustrative examples, number of devices 310 may be, for example, without limitation, number of line replaceable units 316, number of computers 318, number of base stations 319, number of sensor units 320, number of actuators 322, and/or any other suitable type of device. In these illustrative examples, number of base stations 319 and number of sensor units 320 form sensor system 323.

Network 308 is a medium that provides links 324 between number of devices 310. Links 324 may carry information 312 and/or power 314. Links 324 may be facilitated by wires, wireless communication links, fiber optic cables, transmission lines, air interfaces, and/or other suitable types of components. Information 312 and power 314 may be transmitted or carried within links 324 as signals 326.

In the different illustrative examples, at least a portion of links 324 may be provided using number of stringers 328. Number of stringers 328 may be located in interior 330 of aircraft 306. Number of stringers 328 may have number of waveguides 332.

In these illustrative examples, number of stringers 328 may take the form of number of composite stringers 333. In these illustrative examples, number of waveguides 332 and number of stringers 328 may carry signals 326 in the form of number of wireless signals 334. Number of wireless signals 334 may include at least one of information signal 336 and power signal 338.

In these illustrative examples, number of stringers 328 may be connected to structures within aircraft 306 such as, for example, without limitation, fuselage 340, skin 342, ribs 344, frame 346, and/or other suitable structures within aircraft 306. Number of stringers 328 may be noncontiguous. In other words, number of stringers 328, when more than one stringer is present, may not be connected to each other within network 308.

As a result, number of stringers 328 may be connected to each other to form network 308. Further, within network 308, if more than one stringer is present within number of stringers 328, these stringers may be connected to each other. For example, without limitation, stringer 348 and stringer 350 in number of stringers 328 may be connected to each other using transmission line 352. Transmission line 352 may be, for example, without limitation, any structure capable of conducting information signal 336 and/or power signal 338. For example, without limitation, transmission line 352 may be a coaxial cable, an optical cable, and/or some other suitable type of cable.

In some illustrative examples, number of antennas 354 may be connected to number of stringers 328 to transmit number of wireless signals 334 into local area 356 in which portion 358 of number of devices 310 may be located. Local area 356 may be any location within aircraft 306. For example, local area 356 may be in a crown of the cabin, between the skin panel in an interior wall of the cabin in aircraft 306, and/or some other suitable location.

In the illustrative examples, composite stringer 360 is an example of a stringer within number of composite stringers 333. Composite stringer 360 may have channel 362. Foam 364 may be located within channel 362. Additionally, foam 364 also may have channel 366.

Waveguide 368 is an example of a waveguide within number of waveguides 332 and is located within channel 366. Waveguide 368 may be comprised of conductive material 370 and/or dielectric material 372. Depending on the particular implementation, waveguide 368 may be attached to wall 374 of channel 366. Of course, in other advantageous embodiments, waveguide 368 may take the form of structure 376 located within channel 366.

When waveguide 368 takes the form of conductive material 370, conductive material 370 may be metal 378. As a specific example, metal 378 may be a coating applied to wall 374, a foil, a sheet, or some other suitable form of metal 378. In these illustrative examples, metal 378 may be, for example, without limitation, a copper foil. Metal 378 may be attached to wall 374 through a number of different mechanisms. For example, without limitation, metal 378 may be applied using conductive paint, electrolysis metal vapor deposition, and/or other suitable mechanisms.

The illustration of network environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, network 308 may contain only number of stringers 328. Further, some stringers within number of stringers 328 may not include waveguides. As another example, in some advantageous embodiments, only information 312 may be distributed through network 308. In other advantageous embodiments, a stringer within number of stringers 328 may contain multiple waveguides.

In the illustrative examples, waveguide 368 is located within channel 362 for composite stringer 360. In these depicted examples, waveguide 368 is located within channel 366 within foam 364, which is located within channel 362. In other advantageous embodiments, waveguide 368 may be located within channel 362 in composite stringer 360 without foam 364. For example, waveguide 368 may be formed in channel 362 using conductive material 370 and/or dielectric material 372.

Figure 4:
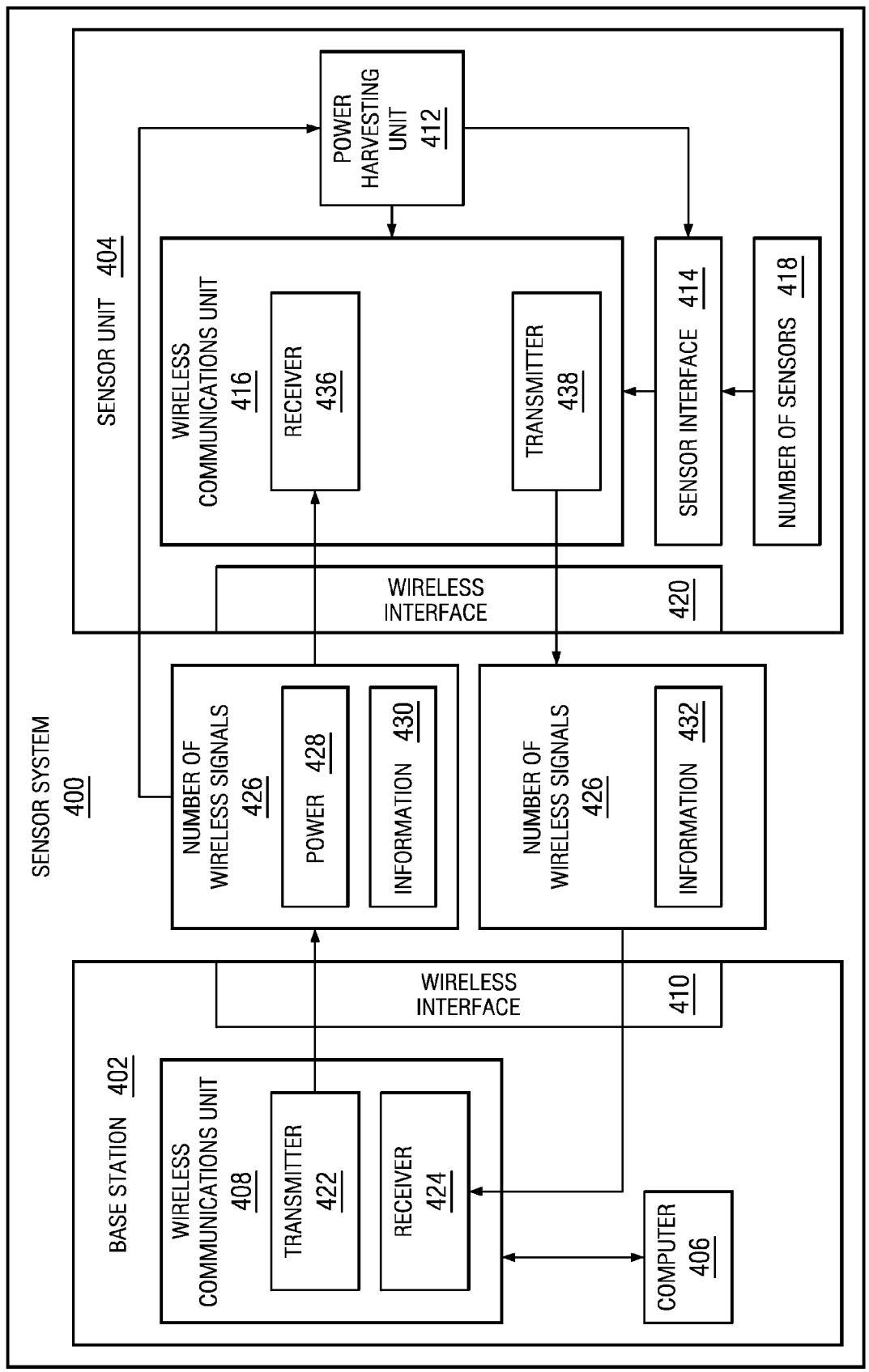
FIG. 4 is a diagram of a sensor system in accordance with an advantageous embodiment.

With reference now to FIG. 4, a diagram of a sensor system is depicted in accordance with an advantageous embodiment. In this illustrative example, sensor system 400 is an example of one implementation for sensor system 323 in FIG. 3.

In this illustrative example, sensor system 400 includes base station 402 and sensor unit 404. Base station 402 may include computer 406, wireless communications unit 408, and wireless interface 410. Sensor unit 404 may include power harvesting unit 412, sensor interface 414, wireless communications unit 416, number of sensors 418, and wireless interface 420. In this illustrative example, wireless communications unit 408 in base station 402 may include transmitter 422 and receiver 424.

Transmitter 422, in these examples, transmits number of wireless signals 426 using wireless interface 420. Wireless interface 420 is hardware configured to transmit or receive wireless signals, such as number of wireless signals 426. Wireless interface 420 may be, for example, without limitation, at least one of an antenna system, a connection to a waveguide, and a waveguide.

Number of wireless signals 426 includes power 428 in these examples. Additionally, number of wireless signals 426 also may include information 430. Power 428 in number of wireless signals 426 provides power for sensor unit 404 in these illustrative examples. Information 430 may include, for example, without limitation, data, commands, instructions, programs, and/or other suitable types of information. In some advantageous embodiments, only power 428 is transmitted in number of wireless signals 426. In other words, sensor unit 404 converts number of wireless signals 426 into power 428.

In this illustrative example, number of sensors 418 measures a physical quantity and converts that measurement into information 432. Information 432 is sent to sensor interface 414 in these examples. In turn, wireless communications unit 416 transmits information 432 as number of wireless signals 426 using wireless interface 420. Number of wireless signals 426 is received by wireless interface 410 with receiver 424 sending information 432 to computer 406 for storage and/or analysis. In these illustrative examples, wireless communications unit 416 includes receiver 436 and transmitter 438. Receiver 436 may be used to receive information. Transmitter 438 transmits information 432.

Additionally, power harvesting unit 412 also receives number of wireless signals 426 through wireless interface 420. Power harvesting unit 412 is a hardware device that generates power using conditions in the environment around power harvesting unit 412. In this illustrative example, power harvesting unit 412 converts at least a portion of number of wireless signals 426 into power 428 for use by the different components within sensor unit 404. In other advantageous embodiments, power harvesting unit 412 may generate power using other sources other than number of wireless signals 426. For example, without limitation, these sources may include photovoltaic sources, thermal energy, temperature gradients, vibration, and other suitable types of energy harvesting devices.

The illustration of sensor system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, wireless communications unit 416 may not include receiver 436. Receiver 436 may be omitted if sensor unit 404 is not programmable or does not receive or process commands. As another example, in some advantageous embodiments, sensor system 400 may include additional sensor units in addition to sensor unit 404. In some advantageous embodiments, base station 402 may not include computer 406. Instead, base station 402 may be connected to a computer directly or a computer in a remote location through a network.

As another example, wireless interface 410 and wireless interface 420 are depicted as individual components. In some advantageous embodiments, these interfaces may be included as part of wireless communication unit 408 and wireless communications unit 416, respectively. In some advantageous embodiments, wireless interface 410 and wireless interface 420 may take the form of antennas. In yet other advantageous embodiments, wireless interface 410 and wireless interface 420 may be a number of waveguides.

Figure 5:
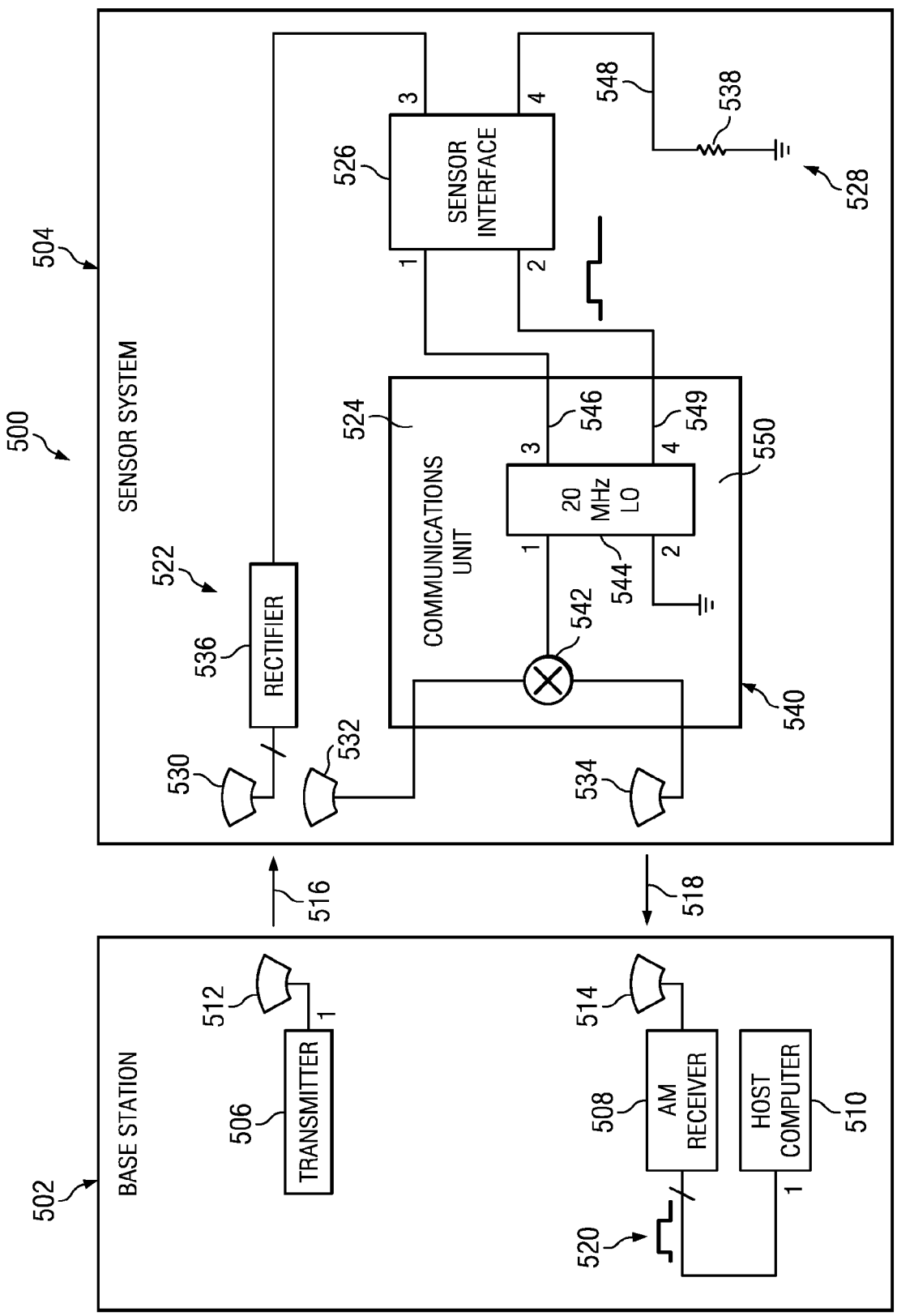
FIG. 5 is a circuit diagram of a sensor system in accordance with an advantageous embodiment.

With reference now to FIG. 5, a circuit diagram of a sensor system is depicted in accordance with an advantageous embodiment. In this illustrative example, sensor system 500 is an example of one implementation for sensor system 400 in FIG. 4.

In this illustrative example, sensor system 500 includes base station 502 and sensor unit 504. Base station 502 includes transmitter 506, receiver 508, computer 510, antenna 512, and antenna 514 in this illustrative example. Transmitter 506 is connected to antenna 512, which is a transmitting antenna in this illustrative example. Receiver 508 is connected to antenna 514, which is a receiving antenna in this example, and computer 510.

In this illustrative example, transmitter 506 operates to transmit wireless signal 516 using antenna 512. In this example, wireless signal 516 has a frequency of around 2.44 gigahertz. Receiver 508 receives wireless signal 518 through antenna 514. In this illustrative example, wireless signal 518 may have a frequency of around 2.42 gigahertz. Receiver 508 converts wireless signal 518 into data 520, which is processed by computer 510 in these illustrative examples. Further, computer 510 also may control the transmission of wireless signal 516 by transmitter 506 in these illustrative examples. In some advantageous embodiments, computer 510 may be omitted from base station 502. With this type of implementation, base station 502 may be connected to a computer or other data processing system that is located externally to base station 502.

Sensor unit 504 includes power harvesting unit 522, communications unit 524, sensor interface 526, sensor 528, antenna 530, antenna 532, and antenna 534. In this illustrative example, antenna 530 and antenna 532 are receiving antennas, and antenna 534 is a transmitting antenna.

Power harvesting unit 522 is connected to antenna 530. Additionally, power harvesting unit 522 is connected to sensor interface 526. Communications unit 524 is connected to antenna 532, antenna 534, and sensor interface 526. Sensor 528 is connected to sensor interface 526.

In this illustrative example, power harvesting unit 522 is a device configured to generate power from an external source. In this illustrative example, power harvesting unit 522 may be implemented with rectifier 536. Rectifier 536 converts wireless signal 516 into power, which may be sent to sensor interface 526 and communications unit 524. In these examples, wireless signal 516 is a radio frequency signal.

In this illustrative example, rectifier 536 may send power to communications unit 524 through sensor interface 526. In other advantageous embodiments, rectifier 536 may be directly connected to communications unit 524.

Sensor 528 may be implemented using a sensor, such as strain gauge 538. Voltage from strain gauge 538 is detected by sensor interface 526 and sent to communications unit 524 for transmission as information in wireless signal 518. In this illustrative example, communications unit 524 may be implemented using radio frequency transceiver 540. In the depicted example, radio frequency transceiver 540 includes mixer 542 and local oscillator 544. Mixer 542 is connected to antenna 532 and antenna 534. Additionally, mixer 542 is connected to local oscillator 544. Local oscillator 544 has connections to sensor interface 526.

In the depicted example, local oscillator 544 may receive power from rectifier 536 through sensor interface 526 at input 546. Information 548 may be a voltage received from strain gauge 538 through sensor interface 526 at input 549. Local oscillator 544 is configured to generate a transmitting signal of a different frequency using mixer 542. Mixer 542 receives wireless signal 516 at antenna 532. Local oscillator 544 takes information 548 and modulates or places that information onto wireless signal 518 having a frequency of about 2.42 gigahertz for transmission by antenna 534.

Figure 6:
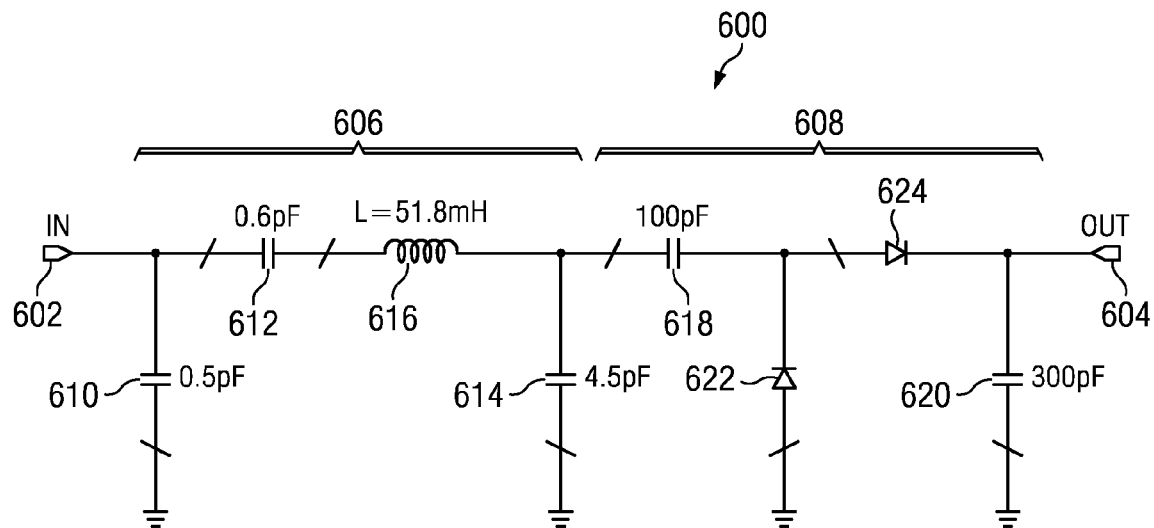
FIG. 6 is a circuit diagram of a rectifier in accordance with an advantageous embodiment.

Turning now to FIG. 6, a circuit diagram of a rectifier is depicted in accordance with an advantageous embodiment. In this illustrative example, rectifier 600 is an example of one implementation for rectifier 536 in FIG. 5. As illustrated, rectifier 600 has input 602 and output 604. Input 602 may be connected to an antenna, such as antenna 530 in FIG. 5. Output 604 may be connected to another device, such as sensor interface 526 in FIG. 5.

Rectifier 600, in this example, includes matching network 606 and doubling detector 608. In this illustrative example, matching network 606 includes capacitor 610, capacitor 612, capacitor 614, and inductor 616. Doubling detector 608 includes capacitor 618, capacitor 620, diode 622, and diode 624.

In this illustrative example, rectifier 600 rectifies radio frequency (RF) power received at input 602 into direct current (DC) power at output 604. As the radio frequency power at input 602 varies, the impedance of doubling detector 608 also varies. Matching network 606 may be used to transform the overall impedance of rectifier 600 such that the impedance for matching network 606 and doubling detector 608 results in power at output 604 with a desired power level. In other words, different values for the components within matching network 606 may be selected to transform the overall impedance for rectifier 600 based on changes in the impedance for doubling detector 608 as the RF power at input 602 varies.

Figure 7:
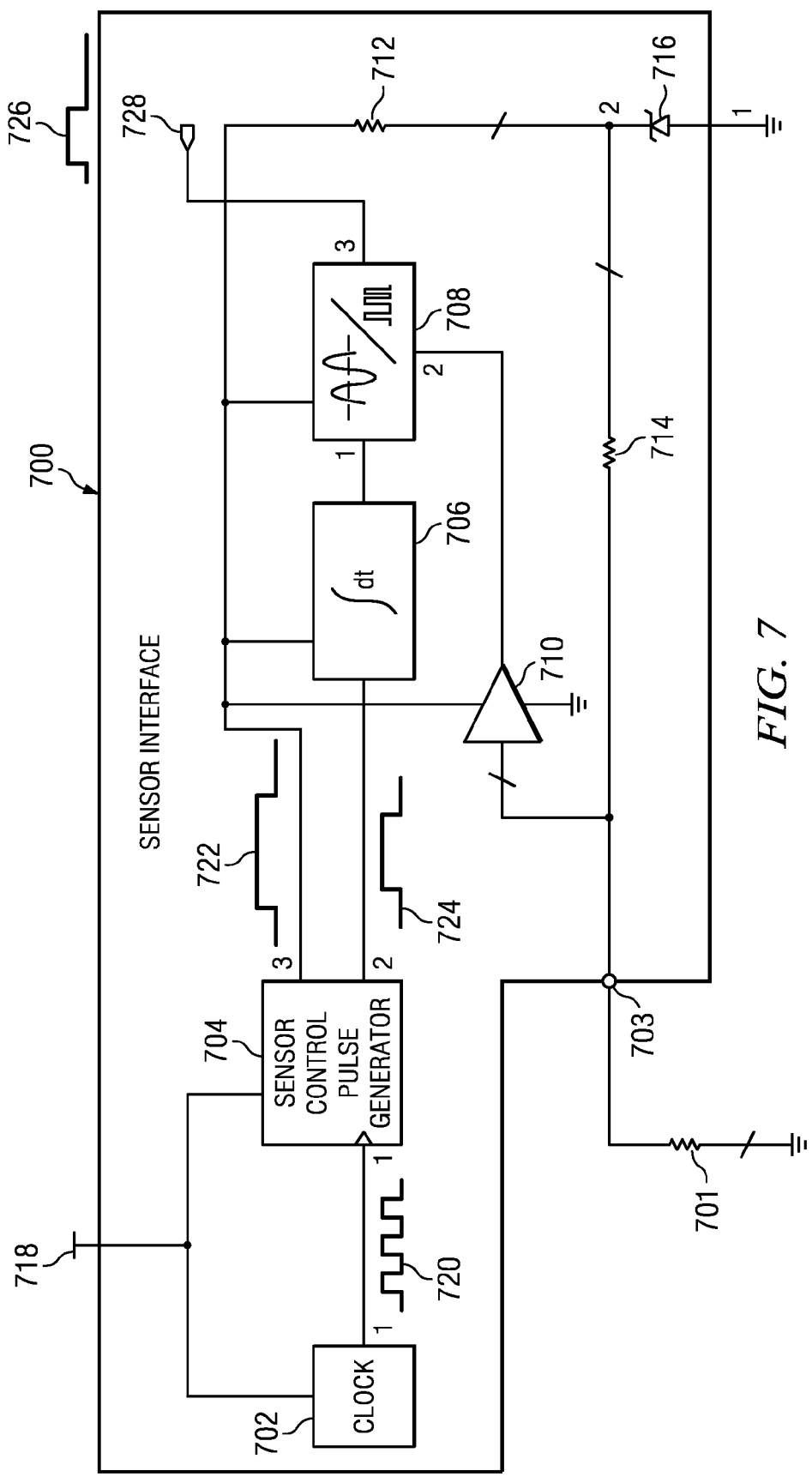
FIG. 7 is a circuit diagram illustrating a sensor interface in accordance with an advantageous embodiment.

Turning now to FIG. 7, a circuit diagram illustrating a sensor interface is depicted in accordance with an advantageous embodiment. In this illustrative example, sensor interface 700 is an example of one implementation for sensor interface 526 in FIG. 5. Sensor interface 700 receives information from sensor 701 at input 703 in this illustrative example.

In this depicted example, sensor interface 700 includes clock 702, sensor control pulse generator 704, integrator 706, comparator 708, scaling amplifier 710, resistor 712, resistor 714, and voltage reference 716. In this example, voltage reference 716 may be a precision voltage reference. Clock 702 and sensor control pulse generator 704 are powered using power from a power harvesting device connected to input 718. Clock 702 generates clock pulse 720.

Clock pulse 720 controls the generation of sensor enable signal 722 and trigger pulse 724 by sensor control pulse generator 704. For example, clock pulse 720 triggers the generation of sensor enable signal 722. Sensor enable signal 722 supplies a voltage pulse that powers integrator 706, comparator 708, scaling amplifier 710, voltage reference 716, and the excitation current for sensor 701. Sensor enable signal 722 may have a duration of around 22 milliseconds.

In this illustrative example, clock pulse 720 may also trigger the generation of trigger pulse 724 after a delay. This delay may be around one millisecond from the generation of clock pulse 720 and sensor enable signal 722. This delay allows the components of sensor interface 700 powered by sensor enable signal 722 to power up and settle. In other words, these components may be allowed to have time to power up and settle before processing information received from sensor 701.

In this example, information from sensor 701 may be processed during the duration of trigger pulse 724. Trigger pulse 724 may have a duration of around 16 milliseconds. In this illustrative example, the duration of trigger pulse 724 is substantially entirely overlapped by the duration of sensor enable signal 722.

In this depicted example, integrator 706 integrates trigger pulse 724. Trigger pulse 724 is integrated to create a linear voltage ramp signal to be applied to comparator 708. Voltage reference 716 supplies the excitation current for sensor 701 through resistor 714. The sensor voltage at input 703 is amplified by scaling amplifier 710 to create an amplified sensor voltage signal to be applied to comparator 708. Comparator 708 compares the amplified sensor voltage signal received from scaling amplifier 710 to the linear voltage ramp signal received from integrator 706. Comparator 708 generates data pulse 726 at output 728. Data pulse 726 may have a duration substantially proportional to the sensor voltage at input 703.

Figure 8:
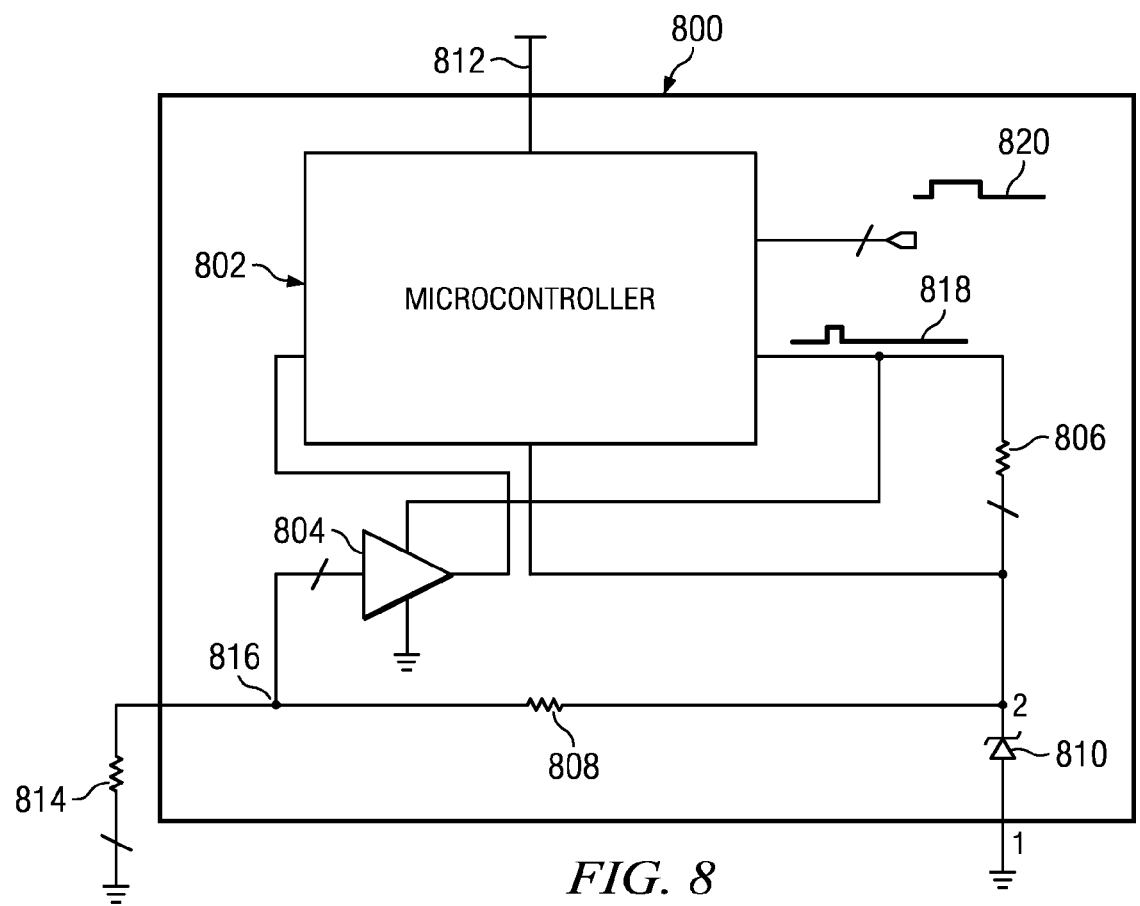
FIG. 8 is a circuit diagram illustrating an example of a sensor interface in accordance with an advantageous embodiment.

Turning now to FIG. 8, a circuit diagram illustrating an example of a sensor interface is depicted in accordance with an advantageous embodiment. In this illustrative example, sensor interface 800 is an example of one implementation for sensor interface 526 in FIG. 5. In this illustrative example, sensor interface 800 includes microcontroller 802, scaling amplifier 804, resistor 806, resistor 808, and voltage reference 810. In this example, voltage reference 810 may be a precision voltage reference.

Microcontroller 802 receives power from a power harvesting device at input 812. Information is received from sensor 814 at input 816. In this illustrative example, microcontroller 802 may be, for example, a digital microcontroller. In particular, microcontroller 802 may be implemented using a PIC 16F688 microcontroller, which may be available from Microchip Technology, Inc.

Microcontroller 802 generates sensor enable signal 818. In this illustrative example, the generation and transmission of sensor enable signal 818 may be controlled by software run on microcontroller 802. Sensor enable signal 818 is a voltage signal that supplies power to voltage reference 810, scaling amplifier 804, and an excitation current for sensor 814. The power may be supplied to these components for a duration selected to sample the information received from sensor 814. The excitation current for sensor 814 is supplied from voltage reference 810 through resistor 808.

In this illustrative example, the sensor voltage at input 816 is amplified by scaling amplifier 804 to create an amplified sensor voltage signal. This amplified sensor voltage signal is applied to an analog to digital converter input in microcontroller 802. The voltage signal received at the analog to digital converter input is sampled and stored as a data value in microcontroller 802. In response to the storing of the data value, sensor enable signal 818 and the components in sensor interface 800 connected to sensor enable signal 818 are turned off.

Additionally, microcontroller 802 generates data pulse 820. Microcontroller 802 outputs data pulse 820 with a duration substantially proportional to the data value stored in microcontroller 802. Microcontroller 802 uses an internal timer to establish a pulse rate for data pulse 820. This pulse rate also may be referred to as a repetition rate. This repetition rate may be a rate programmed into the software internal to microcontroller 802.

In response to data pulse 820 being output from microcontroller 802, microcontroller 802 enters a "sleep" mode in which operation of microcontroller 802 ceases. Microcontroller 802 may use the internal timer to resume operation at the programmed repetition rate. In this illustrative example, microcontroller 802 may use a lower power level in the "sleep" mode as compared to the power level used when performing operations.

Figure 9:
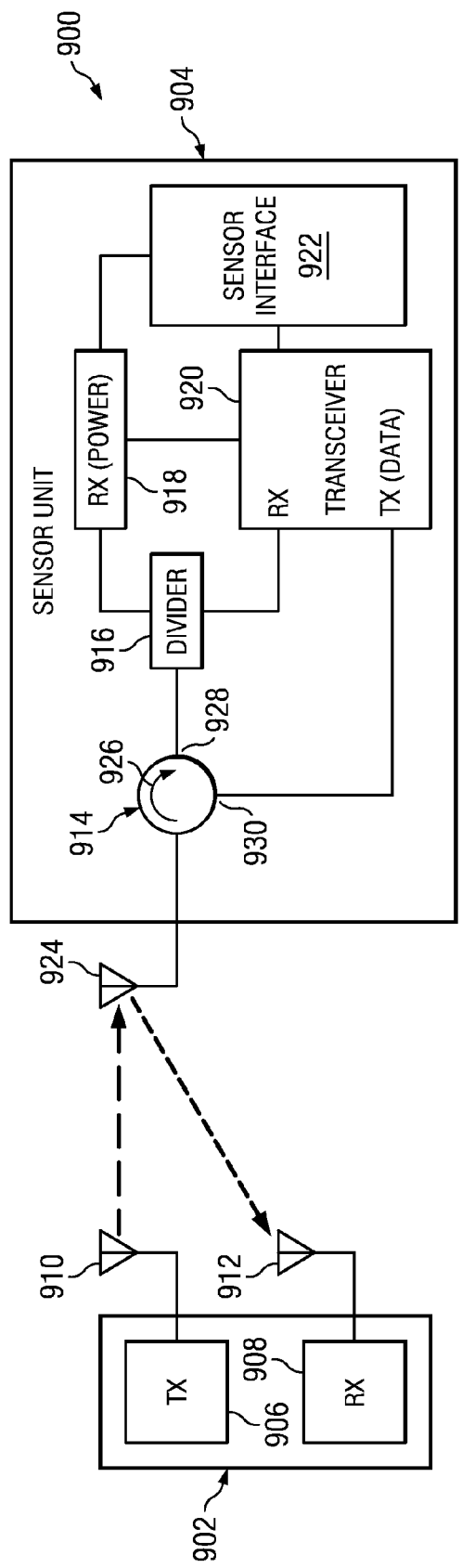
FIG. 9 is a diagram of a sensor system in accordance with an advantageous embodiment.

With reference now to FIG. 9, a diagram of a sensor system is depicted in accordance with an advantageous embodiment. In this illustrative example, sensor system 900 includes base station 902 and sensor unit 904. Base station 902 includes transmitter 906, receiver 908, antenna 910, and antenna 912. Sensor unit 904 includes circulator 914, power divider 916, power harvesting unit 918, transceiver 920, sensor interface 922, and antenna 924.

In this illustrative example, only a single antenna is present in sensor unit 904 as compared to sensor unit 504 in sensor system 500 in FIG. 5. Circulator 914 is a component with three or more ports in which a signal fed into any one of the ports of circulator 914 is transferred to only the next port. In this example, circulator 914 has ports 926, 928, and 930. As a result, a signal being sent into port 926 goes to port 928 and not to port 930.

The signal received from transmitter 906 is sent to divider 916. The signal is sent by divider 916 to both power harvesting unit 918 and to the input of transceiver 920. Information generated by transceiver 920 is sent to circulator 914 through port 930. The signal only exits port 926 to be transmitted by antenna 924 in this illustrative example.

Figure 10:
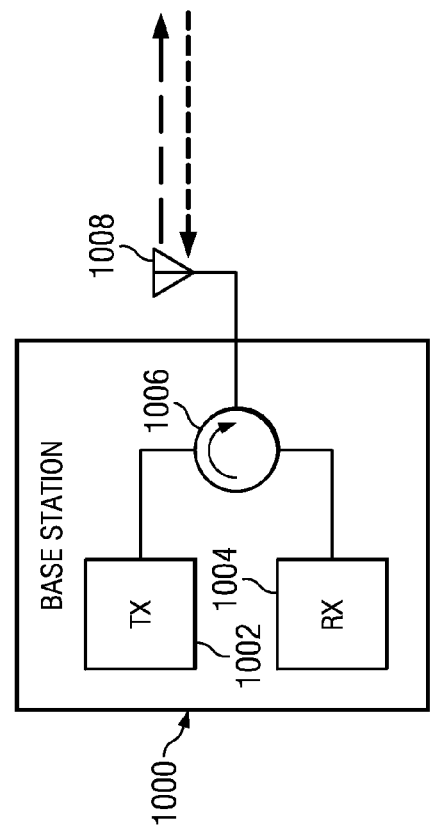
FIG. 10 is an illustration of a base station in accordance with an advantageous embodiment.

Turning now to FIG. 10, an illustration of a base station is depicted in accordance with an advantageous embodiment. In this illustrative example, base station 1000 includes transmitter 1002, receiver 1004, circulator 1006, and antenna 1008. As can be seen in this illustrative example, base station 1000 only has a single antenna, as compared to base station 902 in FIG. 9 and base station 502 in FIG. 5. This base station may transfer information with a sensor unit, such as sensor unit 904 in FIG. 9 or sensor unit 504 in FIG. 5.

Figure 11:
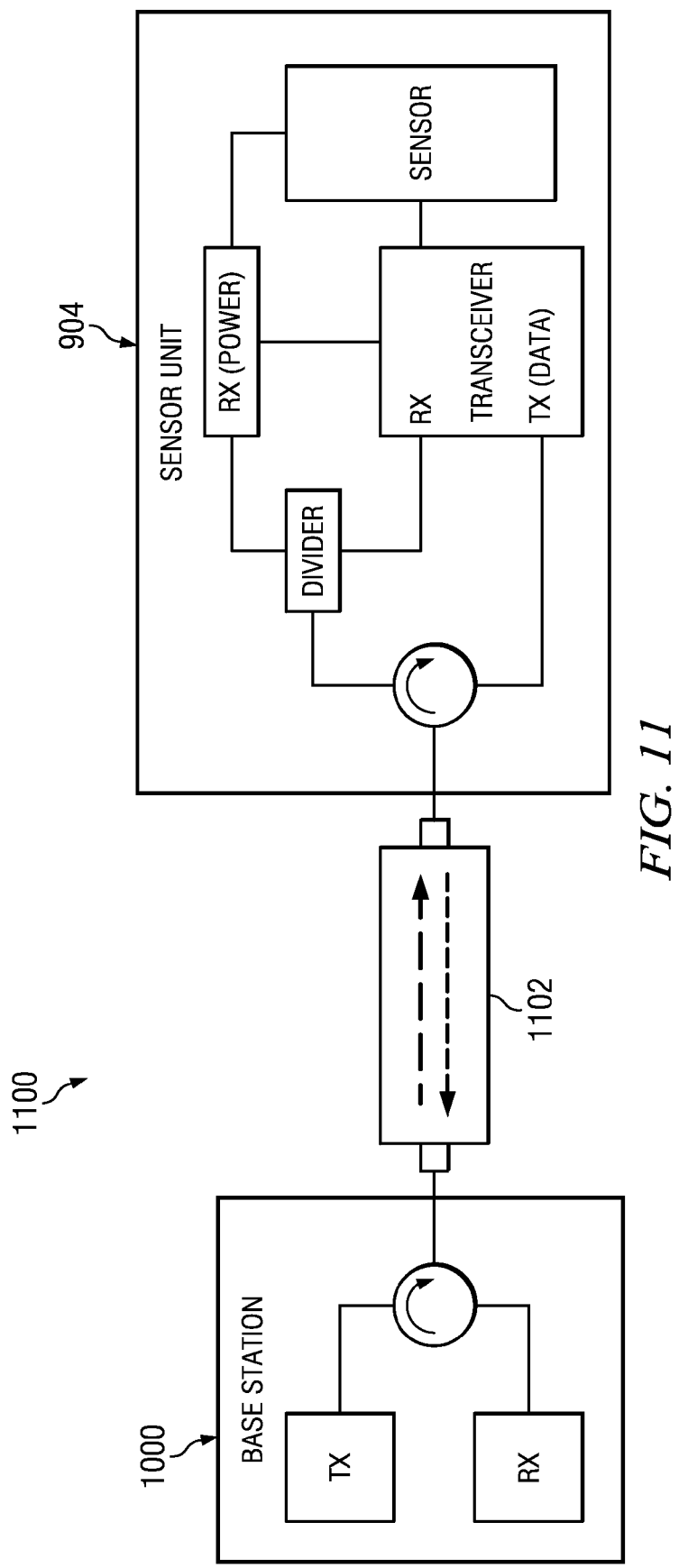
FIG. 11 is a diagram of a sensor system in accordance with an advantageous embodiment.

With reference now to FIG. 11, a diagram of a sensor system is depicted in accordance with an advantageous embodiment. In this illustrative example, sensor system 1100 includes base station 1000 from FIG. 10 and sensor unit 904 from FIG. 9. In this illustrative example, wireless signals containing information are transmitted through waveguide 1102. Waveguide 1102 may be, for example, a waveguide, such as waveguide 368 in composite stringer 360 in FIG. 3.

The illustration of sensor systems, base stations, and sensor units in FIGS. 5-11 are provided for purposes of illustrating some implementations for these components in one or more advantageous embodiments. These illustrations are not meant to limit the manner in which other advantageous embodiments may be implemented. For example, in some advantageous embodiments, waveguides may be connected to each other to form a network in which a sensor system is located. In other advantageous embodiments, a combination of antennas and waveguides may be used to transfer information within a sensor system.

Figure 12:
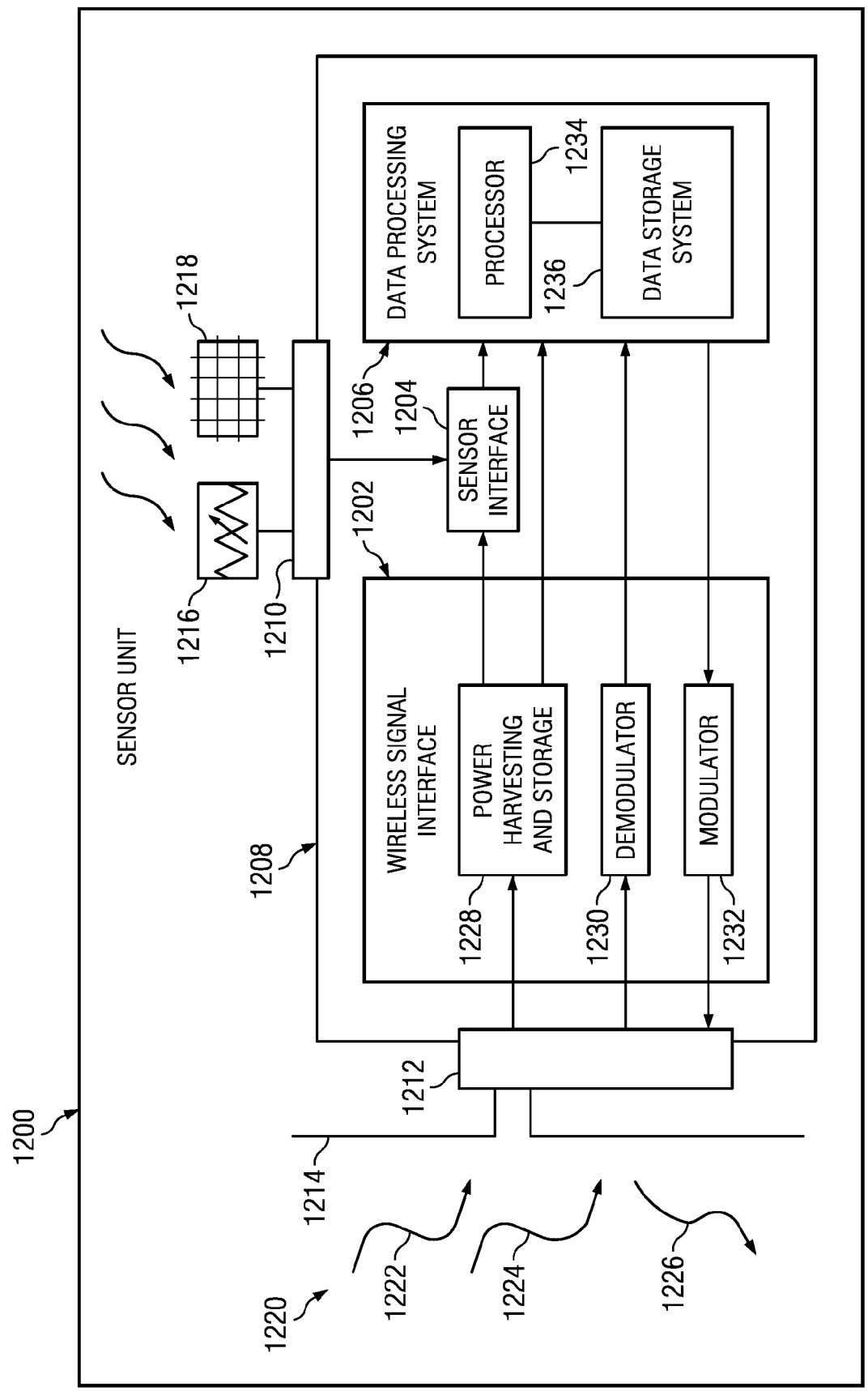
FIG. 12 is a block diagram of a sensor unit in accordance with an advantageous embodiment.

With reference now to FIG. 12, a block diagram of a sensor unit is depicted in accordance with an advantageous embodiment. In this illustrative example, sensor unit 1200 is an example of one implementation for a sensor unit within number of sensor units 320 in FIG. 3. Sensor unit 1200 also is an example of sensor unit 404 in FIG. 4.

Sensor unit 1200, in this illustrative example, includes wireless signal interface 1202, sensor interface 1204, data processing system 1206, housing 1208, sensor connector 1210, antenna connector 1212, antenna 1214, sensor 1216, and sensor 1218. In these illustrative examples, antenna 1214 may receive wireless signals 1220 that may contain at least one of information and/or power. Wireless signals 1220 may include, for example, without limitation, information signal 1222, power signal 1224, and information signal 1226. Information signal 1222 and power signal 1224 are received by antenna 1214. Information signal 1226 is transmitted by antenna 1214.

In this depicted example, wireless signal interface 1202 is connected to antenna 1214 by antenna connector 1212. Wireless signal interface 1202 includes power harvesting and storage 1228, demodulator 1230, and modulator 1232. Power signal 1224 is converted to power by power harvesting and storage 1228 in these examples. This power is sent to sensor interface 1204 and data processing system 1206 to provide power to these components in the illustrative examples.

Demodulator 1230 receives information signal 1222 and sends the information in the signal to data processing system 1206. Further, information generated by data processing system 1206 may be modulated by modulator 1232 and transmitted by antenna 1214 as information signal 1226.

Sensor 1216 and sensor 1218 in sensor unit 1200 measure physical quantities and convert these physical quantities into signals for processing by data processing system 1206. Sensor interface 1204 may measure physical quantities detected by sensors 1216 and 1218 such as, for example, without limitation, temperature, strain, electrical resistance, pressure, and/or other suitable parameters.

In these illustrative examples, two sensors are shown as being present in sensor unit 1200. Of course, in other advantageous embodiments, other numbers of sensors may be used. For example, one sensor, four sensors, or some other suitable number of sensors may be selected for use in sensor unit 1200.

Data processing system 1206, in these illustrative examples, includes processor 1234 and data storage system 1236. Data storage system 1236 may comprise one or more storage devices. These storage devices may be, for example, without limitation, a random access memory, a read-only memory, a flash memory, and/or some other suitable memory.

Figure 13:
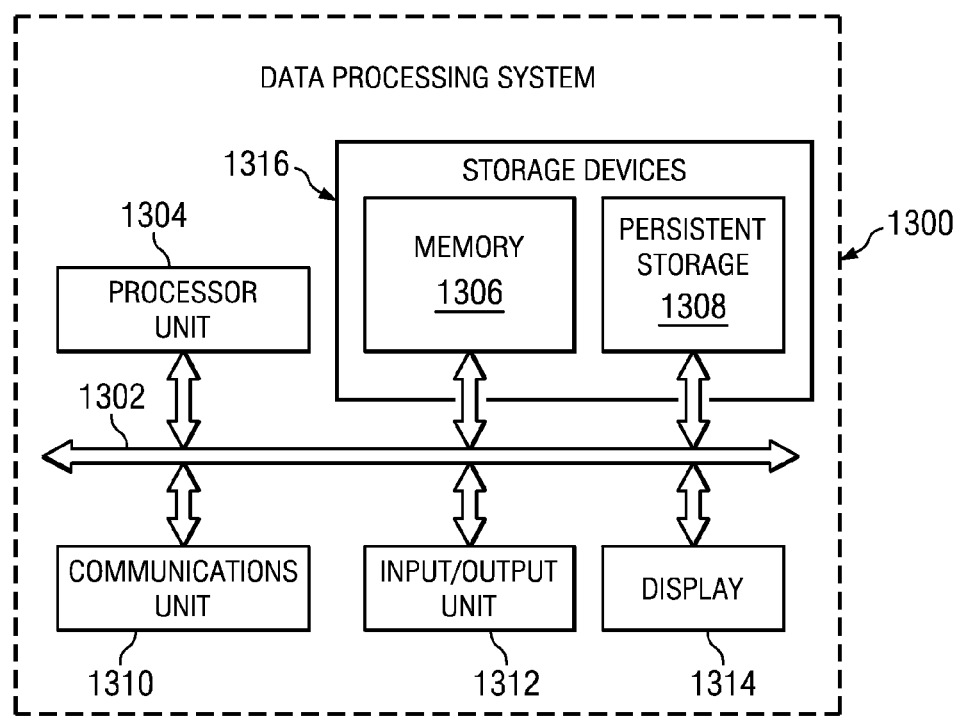
FIG. 13 is a diagram of a data processing system in accordance with an advantageous embodiment.

Turning now to FIG. 13, a diagram of a data processing system is depicted in accordance with an advantageous embodiment. Data processing system 1300 is an example of a device that may be present in number of devices 310 in FIG. 3. In particular, data processing system 1300 may be used to implement devices such as, for example, without limitation, number of line replaceable units 316 and number of computers 318 in FIG. 3. Data processing system 1300 also may be used to implement computer 510 in FIG. 5.

Data processing system 1300 may receive information from number of sensor units 320 and/or other devices within number of devices 310 in FIG. 3. In this illustrative example, data processing system 1300 includes communications fabric 1302, which provides communications between processor unit 1304, memory 1306, persistent storage 1308, communications unit 1310, input/output (I/O) unit 1312, and display 1314.

Processor unit 1304 executes instructions for software that may be loaded into memory 1306. Processor unit 1304 may be a set of one or more processors or may be a multi-processor core, depending on the particular implementation. Further, processor unit 1304 may be implemented using one or more heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information such as, for example, without limitation, data, program code in functional form, and/or other suitable information either on a temporary basis and/or a permanent basis.

Memory 1306, in these examples, may be, for example, a random access memory or any other suitable volatile or non-volatile storage device. Persistent storage 1308 may take various forms, depending on the particular implementation. For example, persistent storage 1308 may contain one or more components or devices. For example, persistent storage 1308 may be a hard drive, a flash memory, a rewritable optical disk, a rewritable magnetic tape, or some combination of the above.

Communications unit 1310, in these examples, provides for communications with other data processing systems or devices. In these examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or tangible computer readable media, such as memory 1306 or persistent storage 1308.

The illustrations of sensor unit 1200 in FIG. 12 and data processing system 1300 in FIG. 13 are not meant to imply physical or architectural limitations to the manner in which different devices may be implemented. Other sensor units and data processing systems may include other components in addition to or in place of the ones illustrated. Further, some advantageous embodiments may exclude some of the components illustrated. For example, in some advantageous embodiments, display 1314 in data processing system 1300 may be unnecessary. In yet other advantageous embodiments, sensor unit 1200 may not include processor 1234. Instead, a controller may be present to send data to another device.

Figure 14:
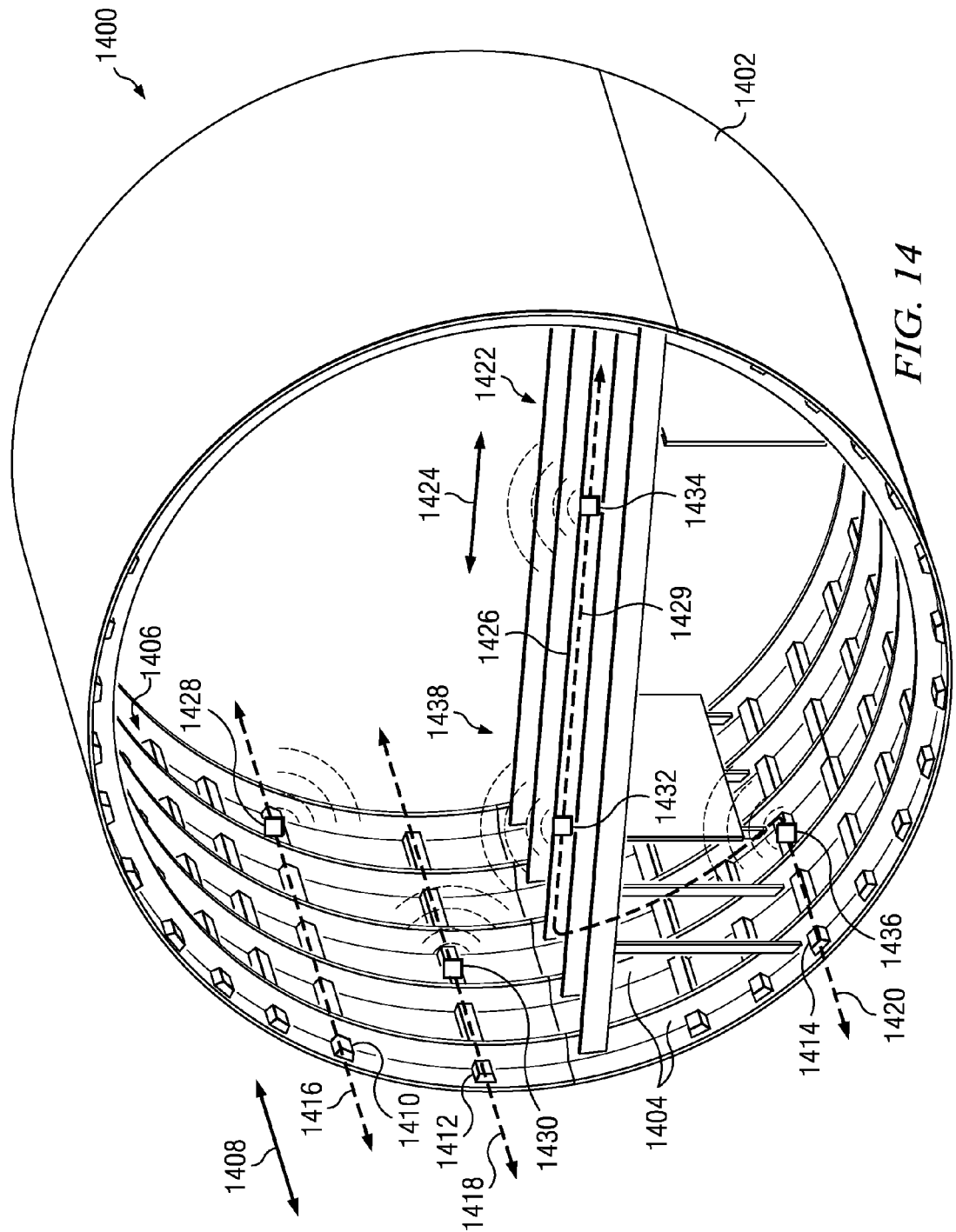
FIG. 14 is a diagram illustrating a portion of a fuselage of an aircraft in accordance with an advantageous embodiment.

Turning now to FIG. 14, a diagram illustrating a portion of a fuselage of an aircraft is depicted in accordance with an advantageous embodiment. In this illustrative example, fuselage 1400 is an example of a portion of a fuselage in aircraft 200 in FIG. 2. Fuselage 1400 is an example of a structure or platform in which a sensor system, such as sensor system 323 in FIG. 3 and sensor system 400 in FIG. 4, may be implemented.

Fuselage 1400 has skin 1402, which may be supported by structures, such as ribs 1404. Stringers 1406 may interconnect and/or run through ribs 1404 in the direction of arrow 1408. In these illustrative examples, one or more of stringers 1406 may have waveguides and carry wireless signals.

For example, stringers 1410, 1412, and 1414 are attached to skin 1402 and carry wireless signals 1416, 1418, and 1420. Additionally, stringers 1422 also may extend in the direction of arrow 1424 within fuselage 1400. In this illustrative example, stringer 1426 carries wireless signal 1429. These different wireless signals may be, for example, information signals and/or power signals.

Further, access points 1428, 1430, 1432, 1434, and 1436 may provide access points to stringers 1410, 1412, 1414, and 1426 to transmit wireless signals 1416, 1418, 1420, and 1429 outside of the waveguides in these stringers. Access point 1428 is integrated or located on stringer 1410. Access point 1430 is located on stringer 1412, and access point 1436 is located on stringer 1414. Access points 1432 and 1434 are located on stringer 1426 in this illustrative example. These components form network 1438 in fuselage 1400. Network 1438 is an example of a network, such as network 308 in FIG. 3.

With reference now to FIG. 15, a diagram illustrating composite stringers connected to each other in a network is depicted in accordance with an advantageous embodiment. In this illustrative example, network 1500 is an example of one implementation of network 308 in FIG. 3. Network 1500 may be comprised of composite stringer 1502, composite stringer 1504, and composite stringer 1508. Composite stringers 1502, 1504, and 1508 are examples of composite stringers that may be connected to each other within number of stringers 328 in FIG. 3.

These composite stringers are connected to each other using transmission lines 1510 and 1512. The connection of these composite stringers in network 1500 may form a bus. In this illustrative example, composite stringer 1502 is connected to composite stringer 1504 by transmission line 1510. Composite stringer 1504 is connected to composite stringer 1508 by transmission line 1512.

Input 1514 provides an input for a signal received from a radio frequency generator in these illustrative examples. Wireless signals may be transmitted through the waveguides in composite stringers 1502, 1504, and 1508 to output 1516, which may be connected to a sensor either by a transmission line or a wireless interface.

Turning now to FIG. 16, a diagram illustrating a cross-sectional perspective view of a hat-shaped stringer with a waveguide is depicted in accordance with an advantageous embodiment. Composite stringer 1600 is an example of an implementation of composite stringer 360 in FIG. 3.

In this illustrative example, composite stringer 1600 has a hat-shape. Composite stringer 1600 is comprised of composite material 1602, foam 1604, and conductive material 1606 for waveguide 1608. In this illustrative example, waveguide 1608 is a rectangular waveguide. Of course, other shapes for waveguide 1608 may be selected. For example, waveguide 1608 may be rectangular, oval, circular, or some other suitable shape.

With reference next to FIG. 17, a diagram of a cross-sectional perspective view of a portion of a composite stringer is depicted in accordance with an advantageous embodiment. In this example, composite stringer 1700 is an example of another implementation for composite stringer 360 in FIG. 3.

In this illustrative example, composite stringer 1700 comprises composite material 1702, foam 1704, and conductive material 1706, which forms a structure for waveguide 1708. In this example, conductive material 1706 on side 1710 of waveguide 1708 may be formed against skin panel 1712.

The examples of composite stringers illustrated in FIGS. 16-17 may employ conductive materials in various forms as described above. For example, without limitation, if copper foil was used, an adhesive film or some other form of adhesive may be applied to the copper foil. This adhesive film may be used to adhere the copper foil to the foam during the curing process.

Further, the illustrative examples show that the waveguides do not need to be completely encompassed within the foam. For example, in FIG. 17, portions of the waveguide may be located against a composite material for the stringer or against skin panel 1712. Also, although only a single waveguide is illustrated in these examples, other advantageous embodiments may employ more than one waveguide that extends through the stringer.

Turning now to FIG. 18, a diagram illustrating a cross-sectional view of a waveguide with an access point is depicted in accordance with an advantageous embodiment. Composite stringer 1800 may be used to implement composite stringers such as, for example, composite stringers 1502, 1504, and 1508 in FIG. 15. In this illustrative example, composite stringer 1800 comprises composite material 1802, foam 1804, and conductive material 1806 for waveguide 1808.

Conductive material 1806 may be placed against wall 1810 of foam 1804 and skin panel 1812. Access point 1814 may be created using coaxial cable 1816. Coaxial cable 1816 may have center conductor 1818 extending into cavity 1820 of waveguide 1808. Center conductor 1818 allows for a propagation of waves within cavity 1820 to travel through coaxial cable 1816. Coaxial cable 1816 may terminate in component 1821.

Coaxial cable 1816, with center conductor 1818, is an example of a transmission line used as a probe in cavity 1820. Component 1821 may be another device, antenna, stringer, or some other suitable component. In other advantageous embodiments, an antenna may be integrated and/or placed into cavity 1820 to form access point 1814.

Distance 1822 may be a distance that center conductor 1818 extends into cavity 1820. Distance 1824 may be a distance from wall 1826 to center conductor 1818. These distances may be determined, in the illustrative examples, using a computer program to optimize the electrical performance of the coax-waveguide interface for the desired frequency range and selected waveguide size.

With reference now to FIG. 19, a diagram of a composite stringer with a location for an access point is depicted in accordance with an advantageous embodiment. In this illustrative example, composite stringer 1900 is an example of an implementation of composite stringer 360 in FIG. 3.

Composite stringer 1900 may be comprised of composite material 1902, foam 1904, and conductive material 1906. Conductive material 1906 is located in channel 1908 of foam 1904 and forms waveguide 1910 within composite stringer 1900. In this illustrative example, plated hole 1912 may be located at distance 1914 from end 1916 of composite stringer 1900. Distance 1914 may be determined by using a computer program to optimize the electrical performance of the coax-waveguide interface for the desired frequency range and selected waveguide size. The probe of FIG. 18 may be inserted in plated hole 1912.

With reference now to FIG. 20, a flowchart of a process for transmitting wireless signals in a vehicle is depicted in accordance with an advantageous embodiment. The process illustrated in FIG. 20 may be implemented in a network environment, such as network environment 300 in FIG. 3. More specifically, the process illustrated in this figure may be implemented in network data processing system 302 in FIG. 3 in a vehicle. This vehicle may take various forms, such as aircraft 306 in FIG. 3.

The process begins by transmitting a number of wireless signals from a first device into a number of waveguides located in a number of stringers in a vehicle (operation 2000). These wireless signals may be transmitted into a waveguide in the number of waveguides in operation 2000 by the first device. This transmission may be made through a cable or other connector connecting the first device to the waveguide.

Alternatively, the first device may transmit the number of wireless signals through an air interface, which is received at an antenna connected to the waveguide. In this manner, the first device is associated with this waveguide. The association, as illustrated in this example, may be a physical connection or a wireless connection that allows for transmission of the wireless signals from the first device into the waveguide in the number of waveguides. In this manner, these wireless signals may be transmitted into the waveguide.

The process then carries the number of wireless signals in the number of waveguides in the number of stringers (operation 2002). The number of wireless signals is received from the number of waveguides at a second device (operation 2004), with the process terminating thereafter. In this illustrative example, the number of wireless signals may be sent to the second device, which is associated with the number of waveguides.

The second device is associated with the number of waveguides by being able to receive the wireless signals from one or more of the number of waveguides. As with the first device, the second device may be connected to one or more of the waveguides at an access point. In other advantageous embodiments, the access point may have an antenna that radiates the wireless signals into an air interface that may be received by the second device.

Figure 21:
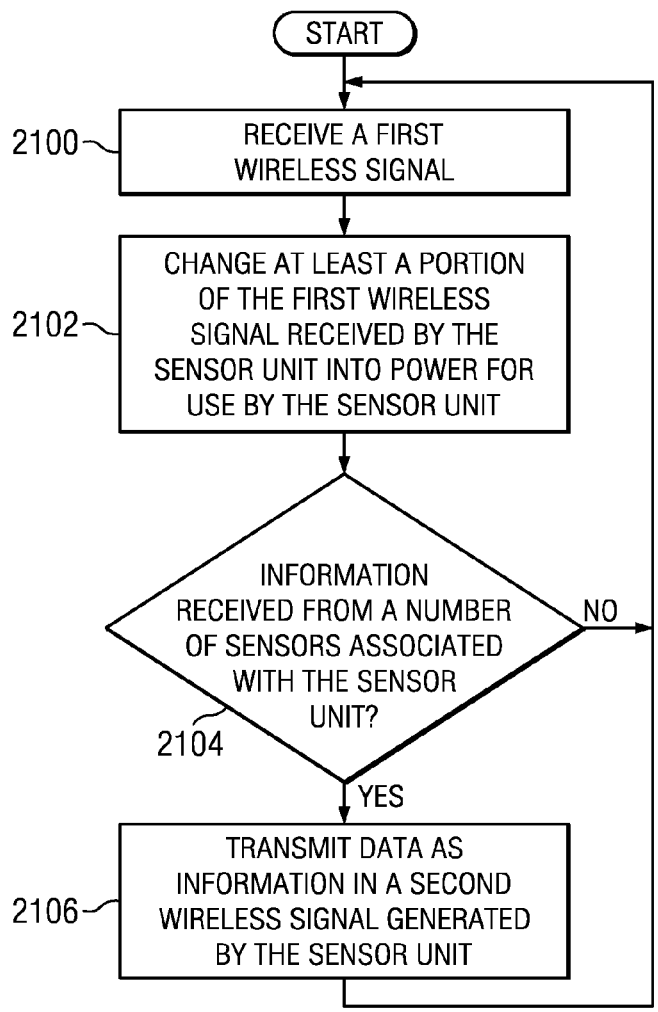
FIG. 21 is a flowchart of a process for transmitting information in accordance with an advantageous embodiment.

Turning next to FIG. 21, a flowchart of a process for transmitting information is depicted in accordance with an advantageous embodiment. The process illustrated in FIG. 21 may be implemented in a sensor system, such as sensor system 400 in FIG. 4. More particularly, this process may be implemented in a sensor unit, such as sensor unit 404 in sensor system 400 in FIG. 4.

The process may begin by receiving a first wireless signal (operation 2100). At least a portion of the first wireless signal received by the sensor unit is changed into power for use by the sensor unit (operation 2102).

A determination is made as to whether information is received from a number of sensors associated with the sensor unit (operation 2104). If information is received, the data is transmitted as information in a second wireless signal generated by the sensor unit (operation 2106), with the process returning to operation 2100 as described above.

With reference again to operation 2104, if data is not received from the number of sensors, the operation also returns to operation 2100.

Figure 22:
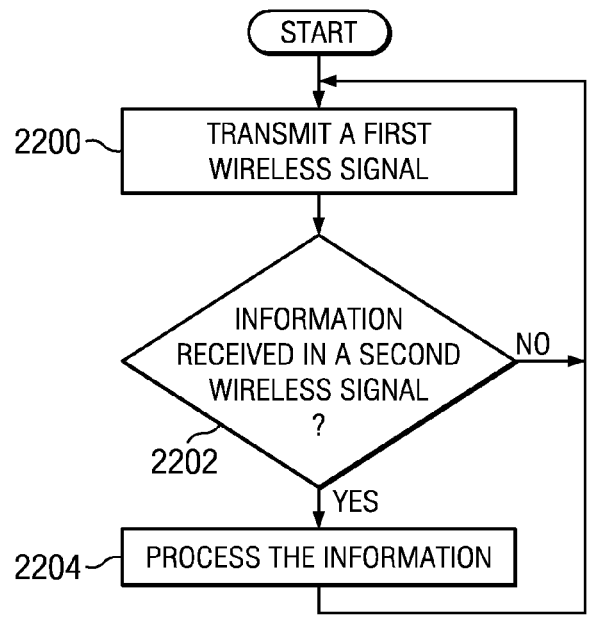
FIG. 22 is a flowchart of a process for supplying power and receiving information in accordance with an advantageous embodiment.

Turning now to FIG. 22, a flowchart of a process for supplying power and receiving information is depicted in accordance with an advantageous embodiment. The process illustrated in FIG. 22 may be implemented in a sensor system, such as sensor system 400 in FIG. 4. More particularly, this process may be implemented in a base station, such as base station 402 in sensor system 400 in FIG. 4.

The process begins by transmitting a first wireless signal (operation 2200). This first wireless signal provides an environmental condition that is used by a power harvesting unit in a sensor unit to generate power to operate the sensor unit.

The process then determines whether information has been received in a second wireless signal (operation 2202). If information is received in a second wireless signal, the information is processed (operation 2204), with the process returning to operation 2200. In these illustrative examples, the processing of information may take different forms. For example, without limitation, the information may be stored, analyzed, transmitted to another device, or some other suitable type of processing may be performed. With reference again to operation 2202, if information is not received in a second wireless signal, the process also returns to operation 2200.

The signals transmitted in FIGS. 21 and 22 may be transmitted over an air interface or through waveguides. These waveguides may be, for example, located in a structure, such as number of composite stringers 333 in FIG. 3.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, operation 2200 and operation 2204 are shown as being performed in a specific sequence in the flowchart. These operations, however, may be performed in a different order or may be performed simultaneously, depending on the particular implementation. As another example, in some advantageous embodiments, additional operations, such as sending a command to the sensor unit in the first wireless signal, may be performed.

Thus, the different advantageous embodiments provide a method and apparatus for transferring information. In one advantageous embodiment, an apparatus comprises a power harvesting unit, a sensor interface, and a wireless communications unit. The power harvesting unit is configured to generate power from a first wireless signal. The sensor interface is configured to receive information from a number of sensors. The wireless communications unit uses the power from the power harvesting unit and transmits the information using a second wireless signal.

With one or more of the different advantageous embodiments, at least one of weight, expense, complexity, and maintenance may be reduced for platforms, such as aircraft, by transmitting information using one or more of the different advantageous embodiments. In one illustrative example, power is obtained from a wireless signal transmitted from a base station to a sensor unit using a power harvesting device in the sensor unit.

Further, the different communications units in the sensor unit and the base stations may transmit signals over an interface using antenna systems. In other advantageous embodiments, the communications units may include or may be connected to wireless interfaces, such as a waveguide in a stringer, and/or other structural components.

The description of the different advantageous embodiments has been presented for purposes of illustration and description, and it is not intended to be exhaustive or limited to the embodiments in the form disclosed. Many modifications and variations will be apparent to those of ordinary skill in the art.

Although the different advantageous embodiments have been described with respect to aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object.

More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a power harvesting unit configured to generate power using a first wireless signal;
a sensor interface configured to receive information from a number of sensors;
a wireless communications unit connected to the sensor interface and the power harvesting unit and configured to use the power generated by the power harvesting unit and to transmit the information using a second wireless signal, wherein the first wireless signal and the second wireless signal are radio frequency signals;
a stringer, comprising an aircraft structural member, having a channel; and
a waveguide located at least partially within the channel, wherein the waveguide is configured to carry the first wireless signal and the wireless communications unit transmits the second wireless signal through the waveguide.

2. The apparatus of claim 1 further comprising:
the number of sensors connected to the sensor interface.

3. The apparatus of claim 2 further comprising:
a processor unit connected to the power harvesting unit and the wireless communications unit and configured to use the power generated by the power harvesting unit and to control transmitting the information received from the number of sensors.

4. The apparatus of claim 2, wherein the number of sensors measures at least one of temperature, strain, electrical resistance, pressure, acceleration, force, sound levels, vibrations, and moisture.

5. The apparatus of claim 1, wherein the number of sensors is configured to measure a number of physical quantities for an aircraft and generate the information in response to measuring the number of physical quantities for the aircraft.

6. The apparatus of claim 1 further comprising:
a base station configured to transmit the first wireless signal.

7. The apparatus of claim 6, wherein the base station is configured to receive the information transmitted using the second wireless signal.

8. The apparatus of claim 7 further comprising:
a computer, wherein the base station is controlled by the computer.

9. The apparatus of claim 1 further comprising:
a wireless interface configured to receive the first wireless signal and transmit the second wireless signal.

10. The apparatus of claim 9, wherein the wireless interface comprises at least one of an antenna system and a number of waveguides.

11. The apparatus of claim 9, wherein the wireless interface is part of the wireless communications unit.

12. The apparatus of claim 1, wherein the stringer is positioned in an interior of a vehicle; a foam material is positioned within the stringer; and the waveguide is positioned at least partially within the foam material.

13. The apparatus of claim 12, wherein the power harvesting unit, the sensor interface, and the wireless communications unit form a sensor unit and wherein the sensor unit and the stringer are part of a network data processing system.

14. A method for transmitting information, the method comprising:
   transmitting a first wireless signal through a waveguide to a sensor unit, the waveguide positioned at least partially in a stringer comprising an aircraft structural member;
   responsive to receiving the first wireless signal, changing at least a portion of the first wireless signal into power for the sensor unit;
   receiving the information from a number of sensors configured to send the information to the sensor unit; and
   transmitting the information in a second wireless signal generated by the sensor unit, wherein the first wireless signal and the second wireless signal are radio frequency signals.

15. The method of claim 14, wherein the step of changing at least the portion of the first wireless signal into the power for the sensor unit comprises:
   changing at least the portion of the first wireless signal into the power for the sensor unit using a power harvesting unit in the sensor unit configured to change at least the portion of the first wireless signal into the power.

16. The method of claim 15, wherein the power harvesting unit comprises a rectifier configured to change the at least the portion of the first wireless signal into the power.

17. The method of claim 14 further comprising:
   transmitting the first wireless signal from a base station.

18. The method of claim 14 further comprising:
   receiving the information in the second wireless signal at a base station; and
   processing the information in the second wireless signal.

19. A method for operating a sensor system, the method comprising:
   transmitting a first wireless signal through a waveguide from a base station to a sensor unit, the waveguide positioned at least partially within a stringer comprising an aircraft structural member;
   changing at least a portion of the first wireless signal into power for the sensor unit using a power harvesting unit in the sensor unit;
   receiving information from a number of sensors associated with the sensor unit; and
   transmitting the information through the waveguide to the base station using a second wireless signal, wherein the first wireless signal and the second wireless signal are radio frequency signals.

20. The method of claim 19, wherein the sensor unit comprises the power harvesting unit configured to generate the power from the first wireless signal; a sensor interface configured to receive the information from the number of sensors; and a wireless communications unit connected to the sensor interface and the power harvesting unit and configured to use the power generated by the power harvesting unit and configured to transmit the information using the second wireless signal.

21. The method of claim 19, wherein the base station comprises a transmitter configured to transmit the first wireless signal and configured to receive the second wireless signal.

22. The method of claim 19 wherein the stringer comprises a composite stringer with a channel, and wherein the waveguide comprises a conductive material positioned on a wall of the channel.

* * * * *